(12) United States Patent
Imamura

(10) Patent No.: US 9,767,080 B2
(45) Date of Patent: Sep. 19, 2017

(54) MOBILE TERMINAL DEVICE, STORAGE MEDIUM, AND DISPLAY CONTROL METHOD

(75) Inventor: Hitoshi Imamura, Nishinomiya (JP)

(73) Assignee: KYOCERA CORPORATION, Kyoto (JP)

( * ) Notice: Subject to any disclaimer, the term of this patent is extended or adjusted under 35 U.S.C. 154(b) by 183 days.

(21) Appl. No.: 14/113,766

(22) PCT Filed: Apr. 24, 2012

(86) PCT No.: PCT/JP2012/060922
§ 371 (c)(1),
(2), (4) Date: Oct. 24, 2013

(87) PCT Pub. No.: WO2012/147720
PCT Pub. Date: Nov. 1, 2012

(65) Prior Publication Data
US 2014/0053066 A1    Feb. 20, 2014

(30) Foreign Application Priority Data
Apr. 26, 2011    (JP) .................... 2011-098778

(51) Int. Cl.
*G06F 17/20*    (2006.01)
*G06F 17/21*    (2006.01)
(Continued)

(52) U.S. Cl.
CPC .......... *G06F 17/217* (2013.01); *G06F 3/0483* (2013.01); *G06F 3/0485* (2013.01);
(Continued)

(58) Field of Classification Search
CPC ............. G06F 17/30905; G06F 17/211; G06F 17/214; G06F 3/0488
See application file for complete search history.

(56) References Cited

U.S. PATENT DOCUMENTS 5,900,876 A * 5/1999 Yagita ................... G06F 3/0483
715/776
8,024,658 B1 * 9/2011 Fagans ............... G06Q 30/0621
715/243
(Continued)

FOREIGN PATENT DOCUMENTS

JP    08-076926    3/1996
JP    2001-202192 A    7/2001
(Continued)

OTHER PUBLICATIONS

International Search Report for corresponding international application PCT/JP2012/060922 mailed on Jun. 12, 2012 in 4 pages.
(Continued)

*Primary Examiner* — Keith Bloomquist
*Assistant Examiner* — Shahid Khan
(74) *Attorney, Agent, or Firm* — Procopio Cory Hargreaves and Savitch LLP

(57) ABSTRACT

A cellular phone includes a display surface; a touch sensor configured to detect an input with respect to the display surface; and a CPU configured to control a display. In the case where a predetermined page of an electronic document is displayed on the display, the CPU updates, while an input is continuously detected by the touch sensor, an amount to be turned when pages of the electronic document are turned, and determines an amount to be turned by which the electronic document is turned based on the updated amount to be turned at a timing when the input is terminated.

11 Claims, 30 Drawing Sheets

(51) Int. Cl.
*G06F 3/0483* (2013.01)
*G06F 3/0485* (2013.01)
*G06F 3/0488* (2013.01)
*G06F 3/0481* (2013.01)

(52) U.S. Cl.
CPC ........ *G06F 3/0488* (2013.01); *G06F 3/04817* (2013.01); *G06F 3/04883* (2013.01)

(56) References Cited

U.S. PATENT DOCUMENTS

| | | | |
|---|---|---|---|
| 2001/0024195 A1 | 9/2001 | Hayakawa | |
| 2004/0085364 A1* | 5/2004 | Keely | G06F 3/0483 715/804 |
| 2007/0058210 A1 | 3/2007 | Sakuramata et al. | |
| 2008/0022229 A1* | 1/2008 | Bhumkar | G06F 17/30899 715/838 |
| 2009/0006938 A1* | 1/2009 | Yoo | G06F 17/30899 715/205 |
| 2010/0275150 A1 | 10/2010 | Chiba et al. | |
| 2010/0282524 A1* | 11/2010 | Linotte | G06F 3/0416 178/18.01 |
| 2011/0050591 A1* | 3/2011 | Kim | G06F 3/0488 345/173 |
| 2012/0066591 A1* | 3/2012 | Hackwell | G06F 3/0483 715/702 |
| 2012/0297302 A1* | 11/2012 | Barraclough | G06F 3/0485 715/716 |
| 2014/0380247 A1* | 12/2014 | Tecarro | G06F 3/0483 715/863 |

FOREIGN PATENT DOCUMENTS

| | | |
|---|---|---|
| JP | 2001-265481 A | 9/2001 |
| JP | 2006-085424 A | 3/2006 |
| JP | 2007-110677 A | 4/2007 |
| JP | 2011-060127 A | 3/2011 |
| WO | 2009/044770 A1 | 4/2009 |

OTHER PUBLICATIONS

International Preliminary Report on Patentability issued for International Application No. PCT/JP2012/060922.

* cited by examiner

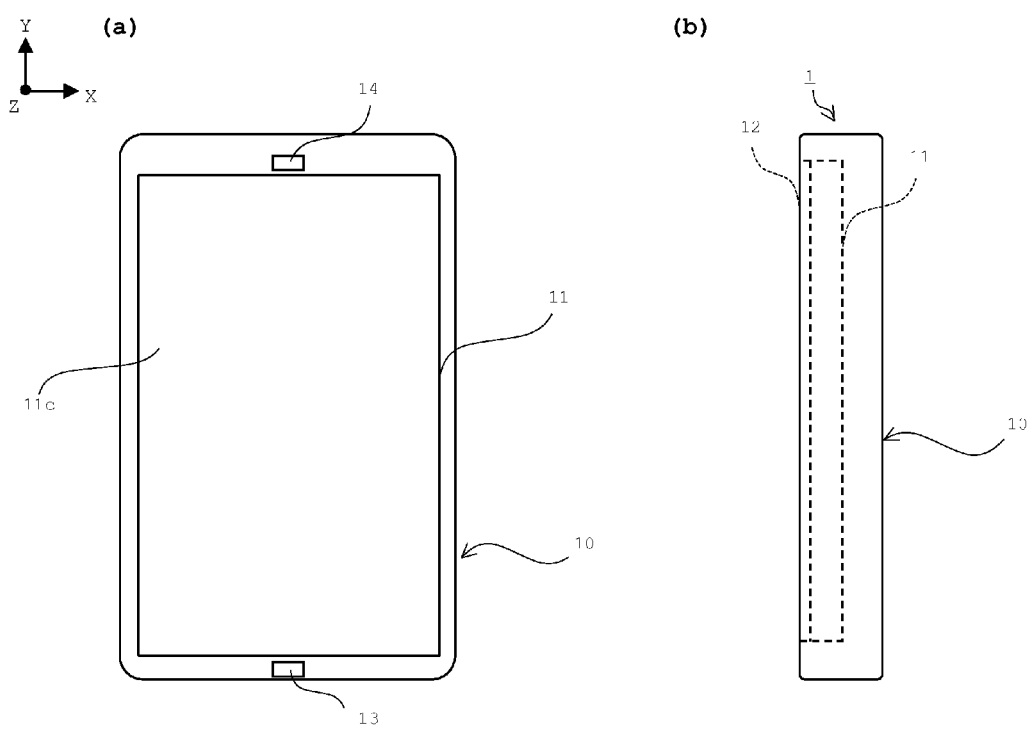
[FIG.1]

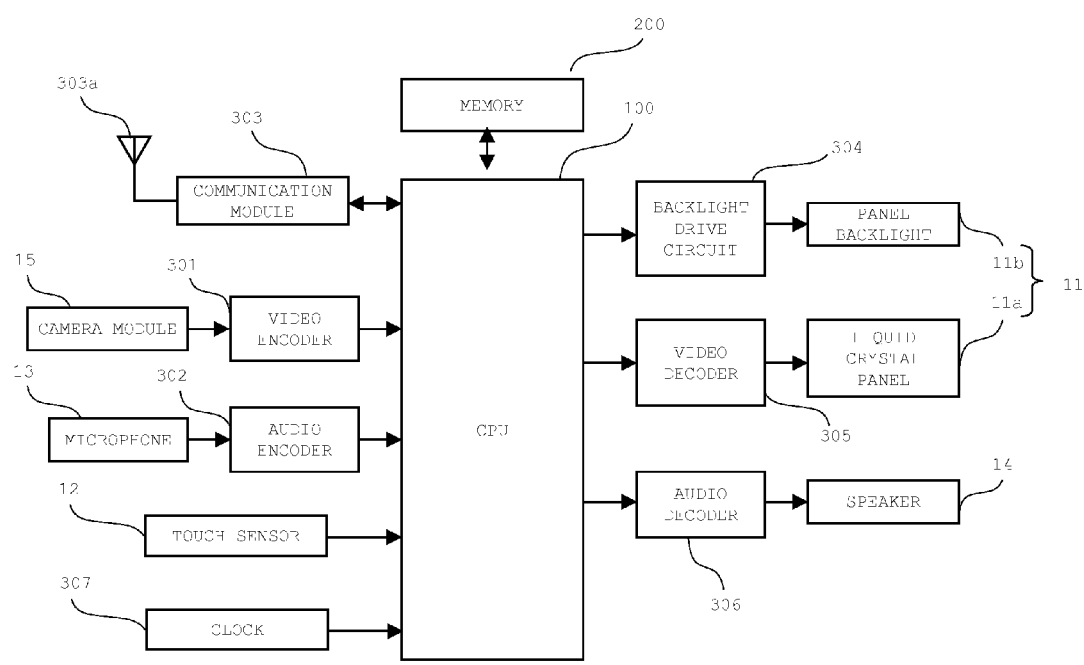
[FIG.2]

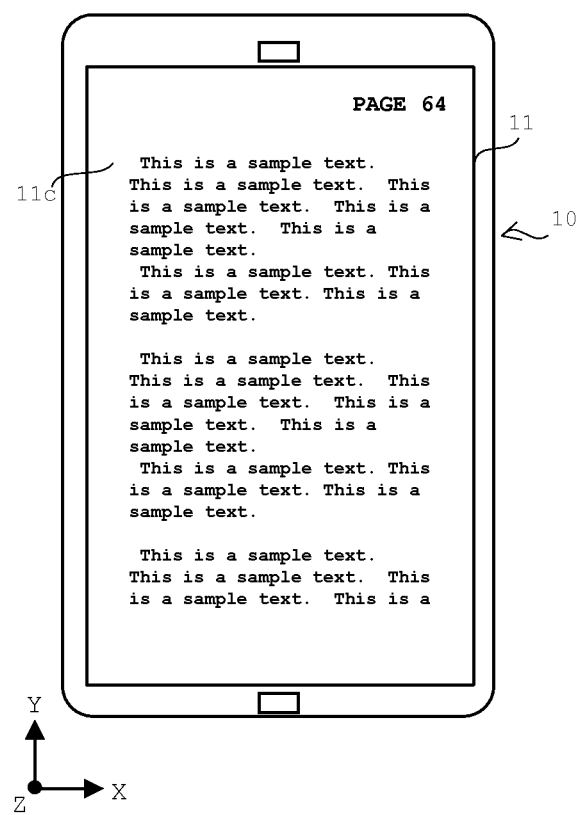
[FIG.3]

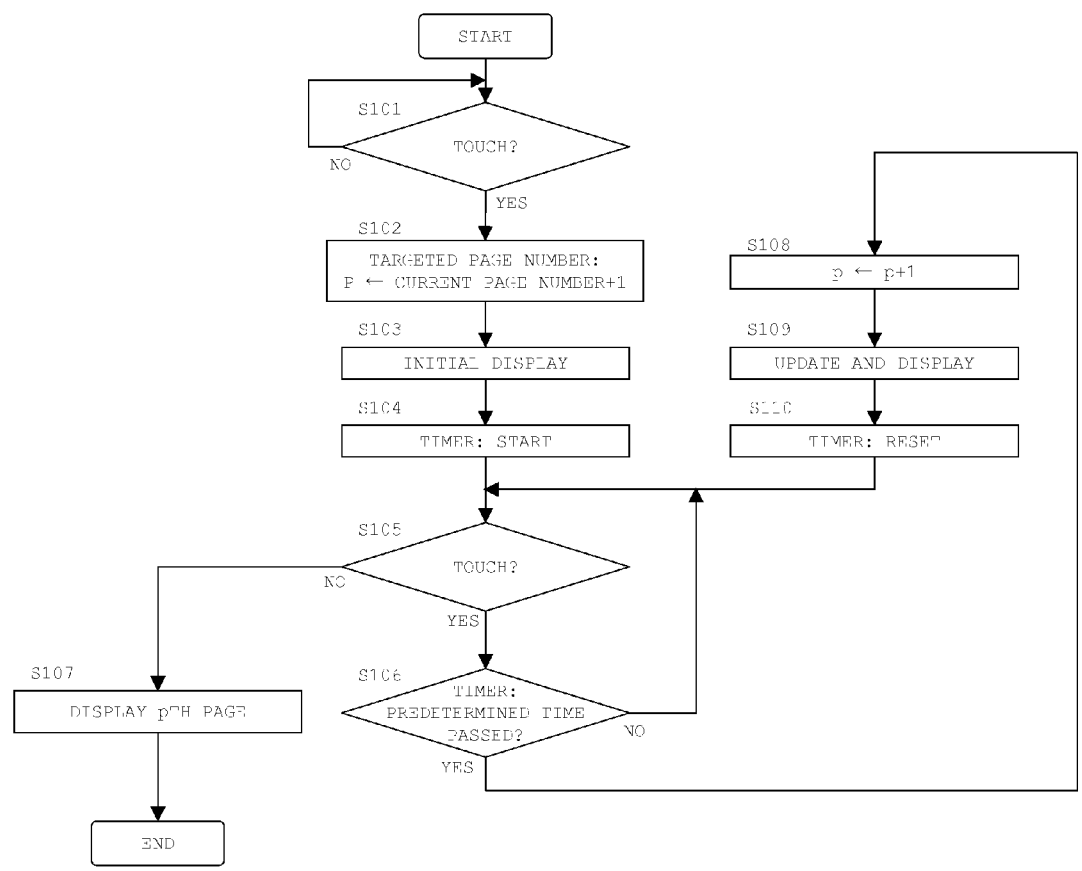
[FIG.4]

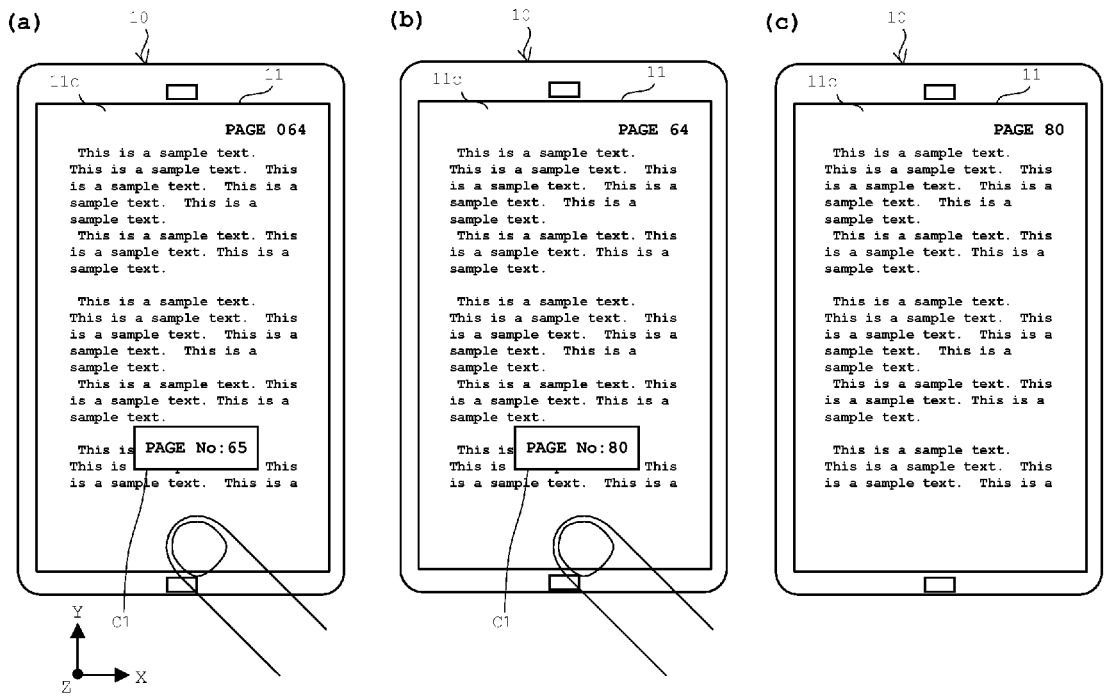
[FIG.5]

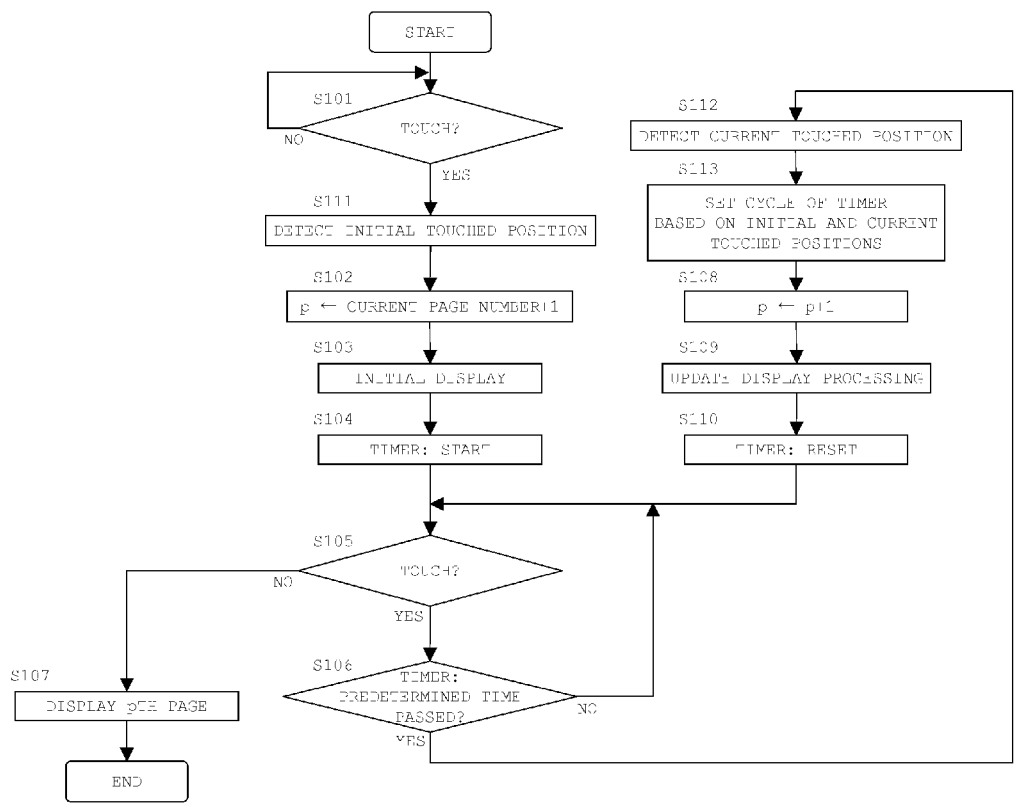
[FIG.6]

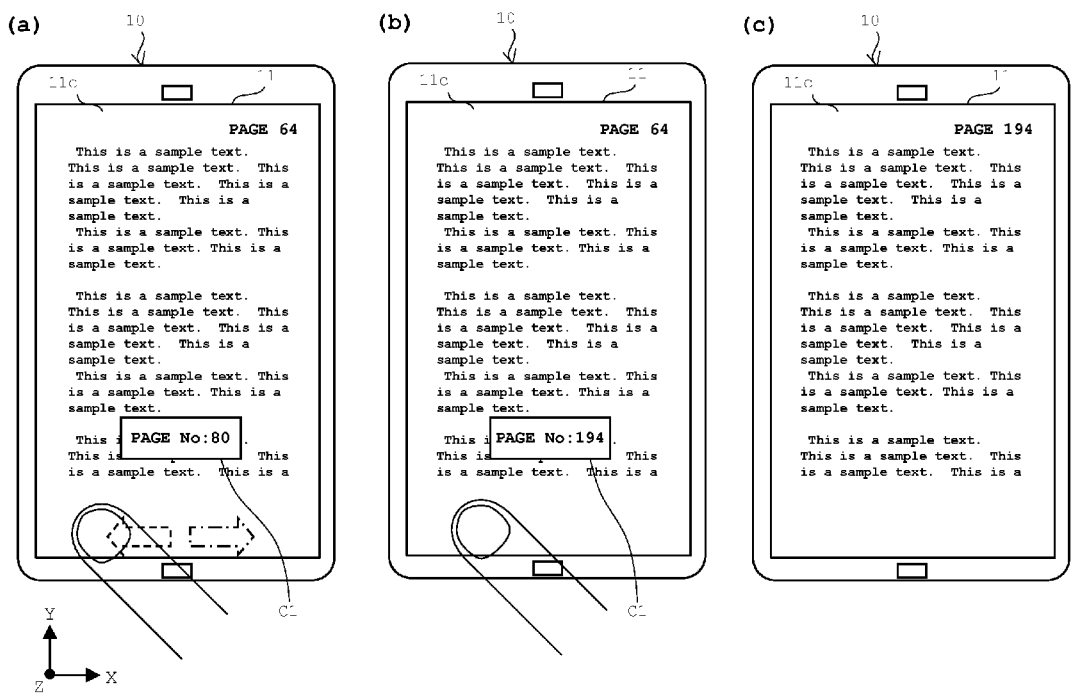
[FIG.7]

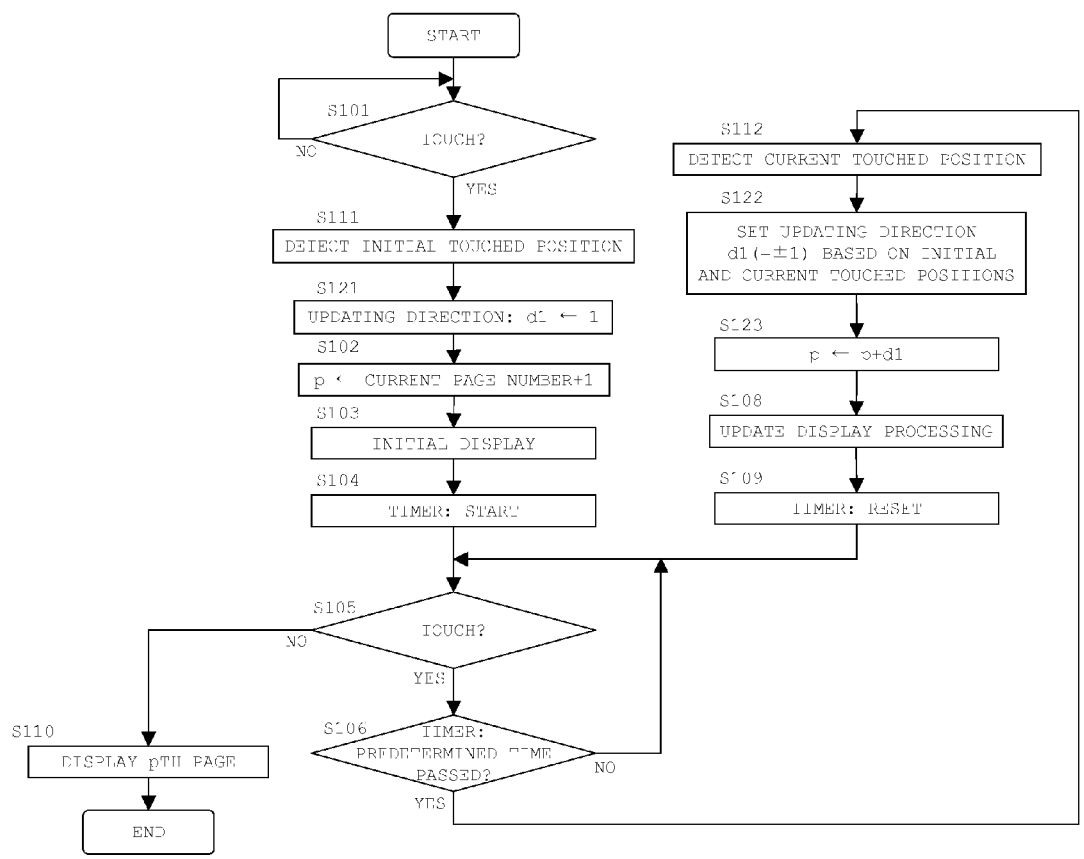
[FIG.8]

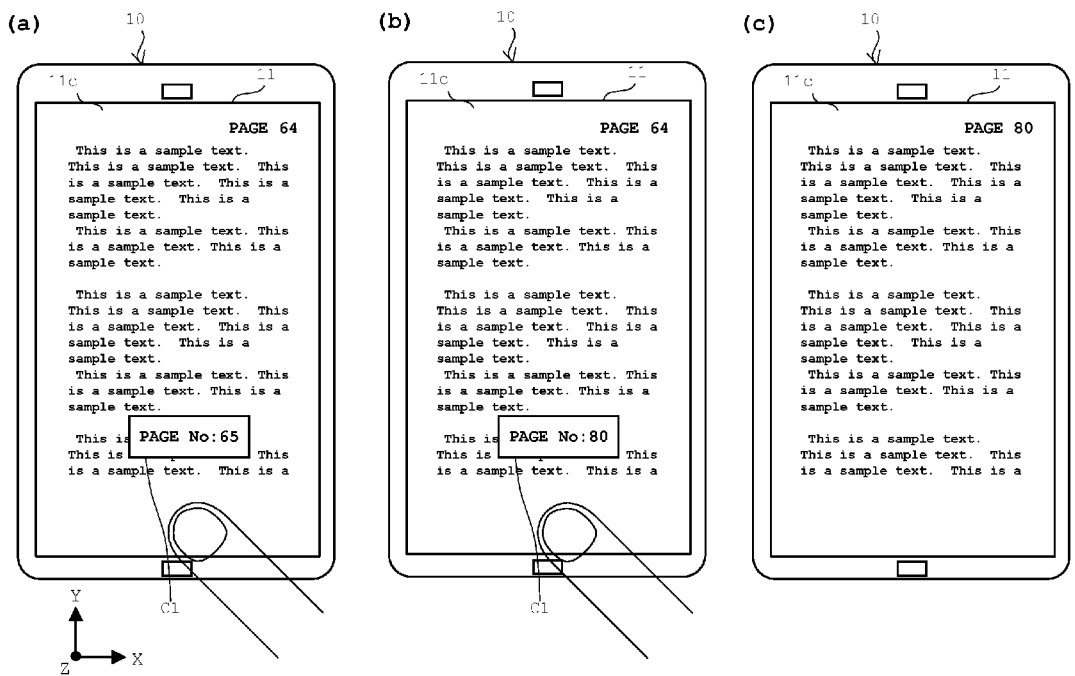
[FIG.9]

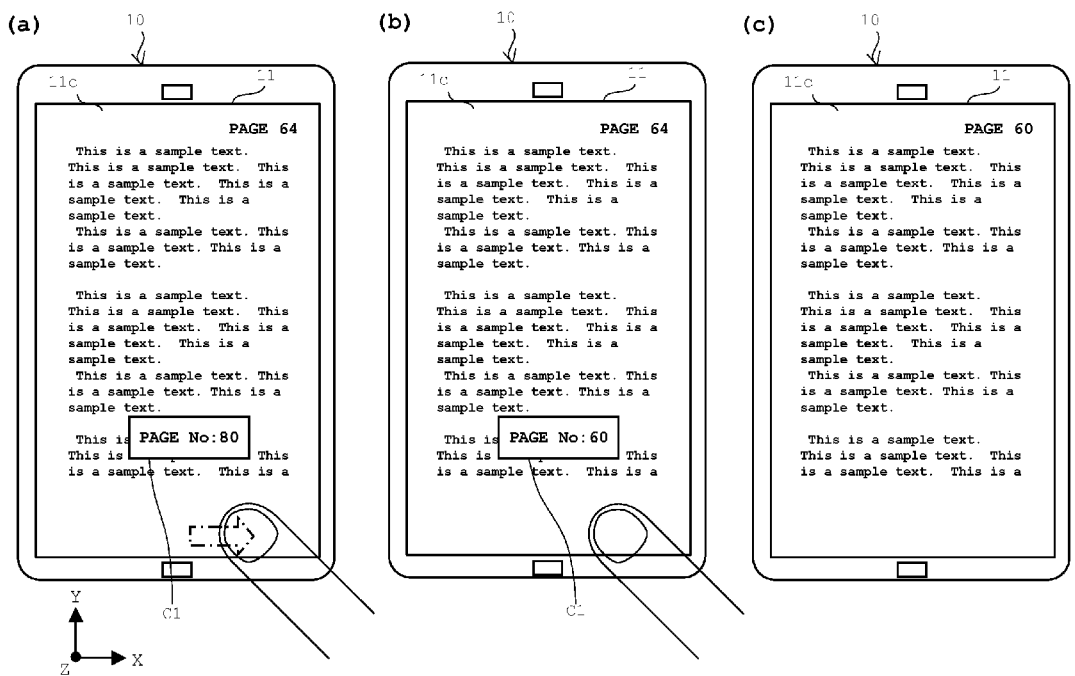
[FIG.10]

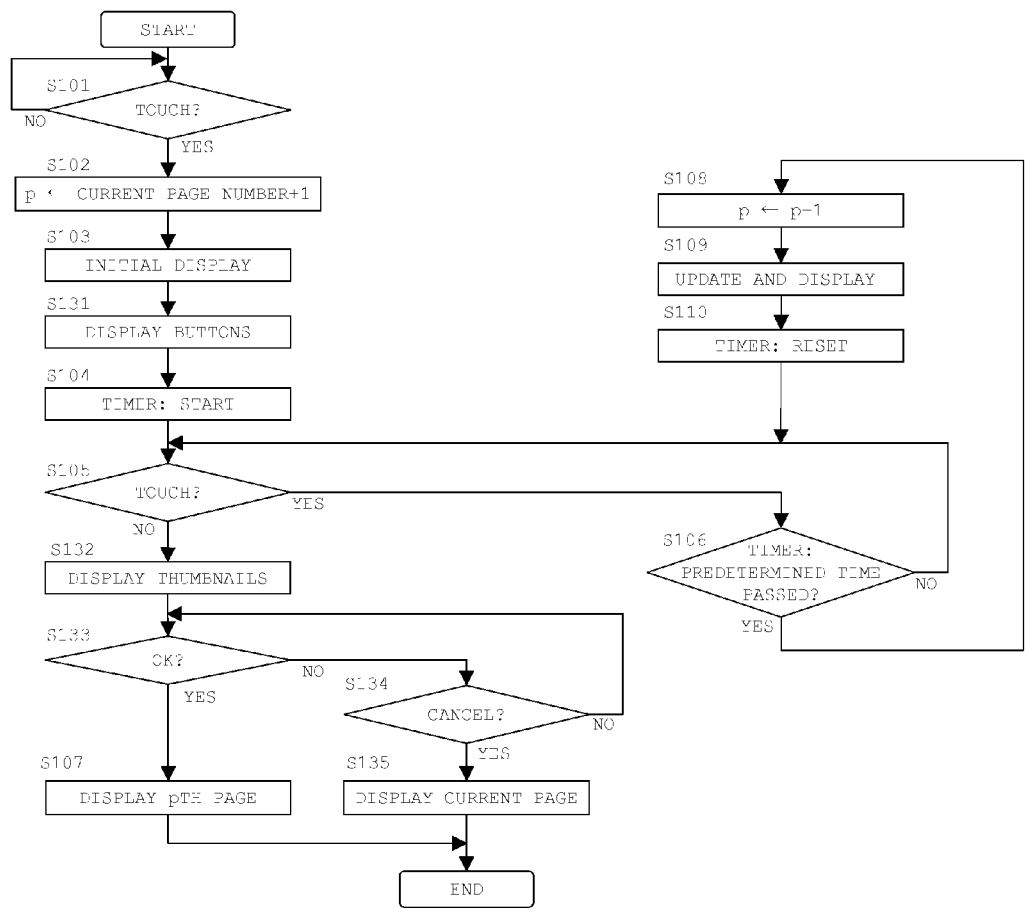
[FIG.11]

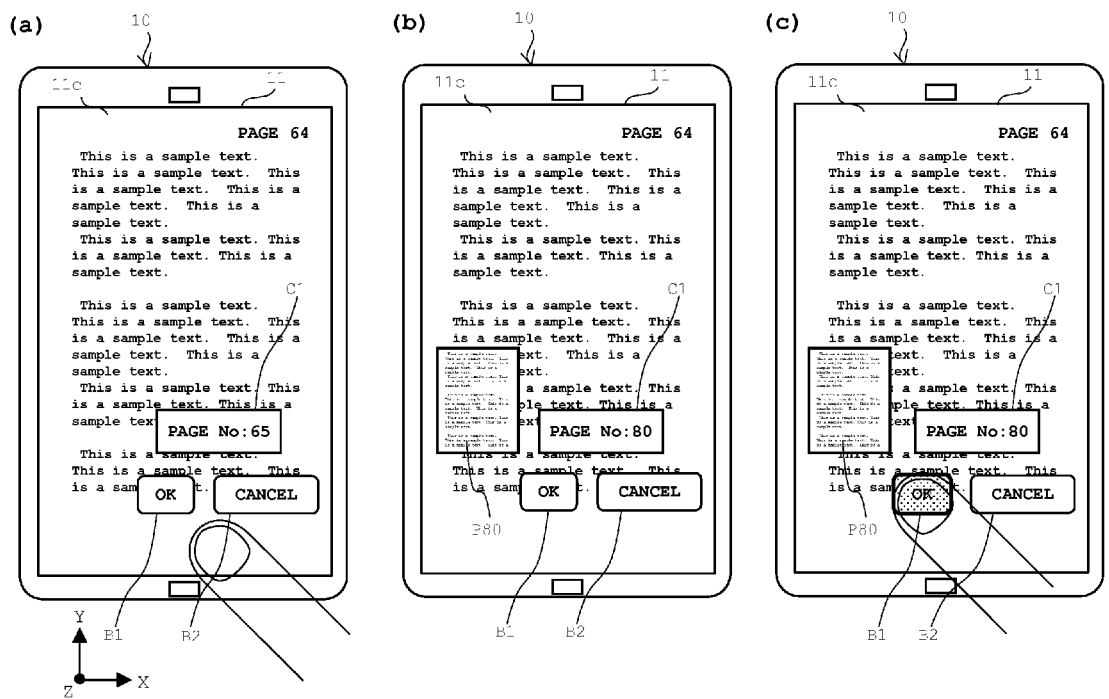
[FIG.12]

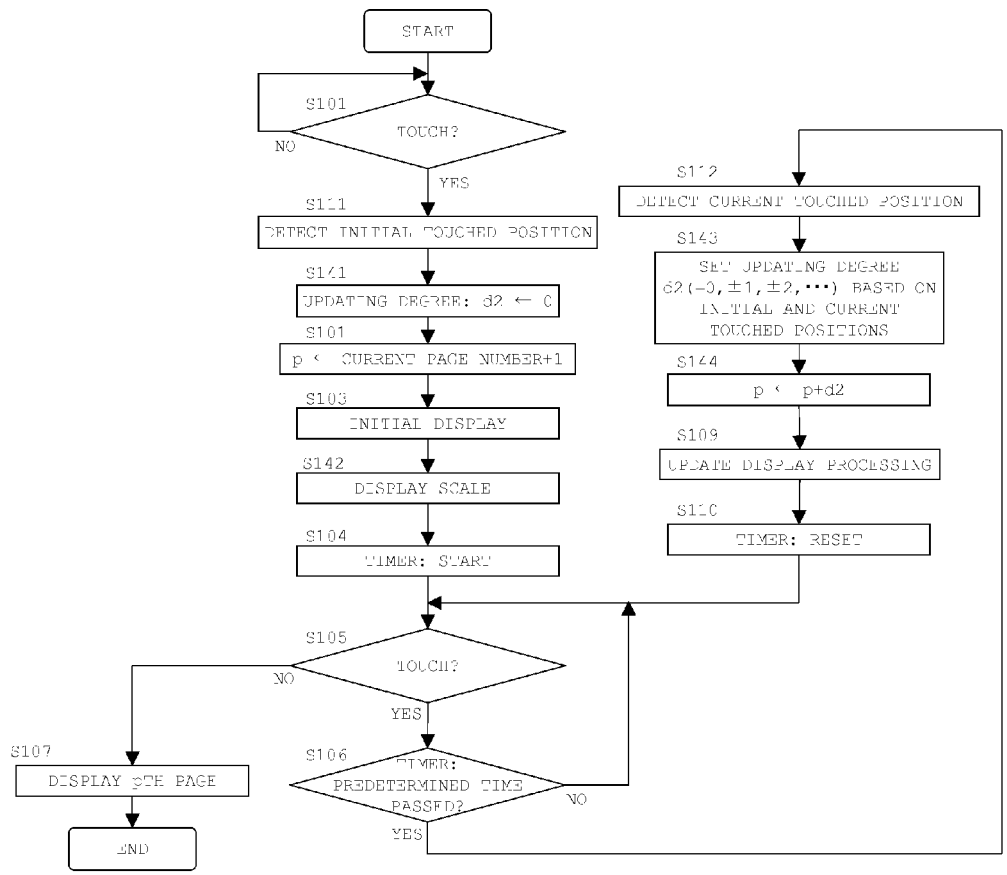
[FIG.13]

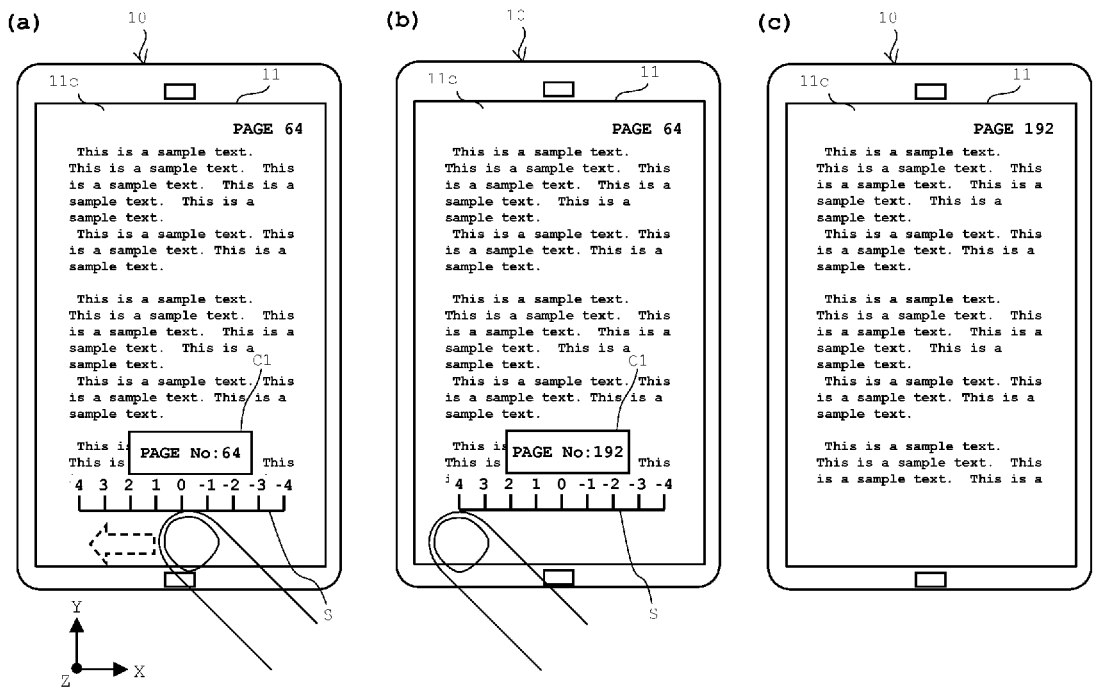
[FIG.14]

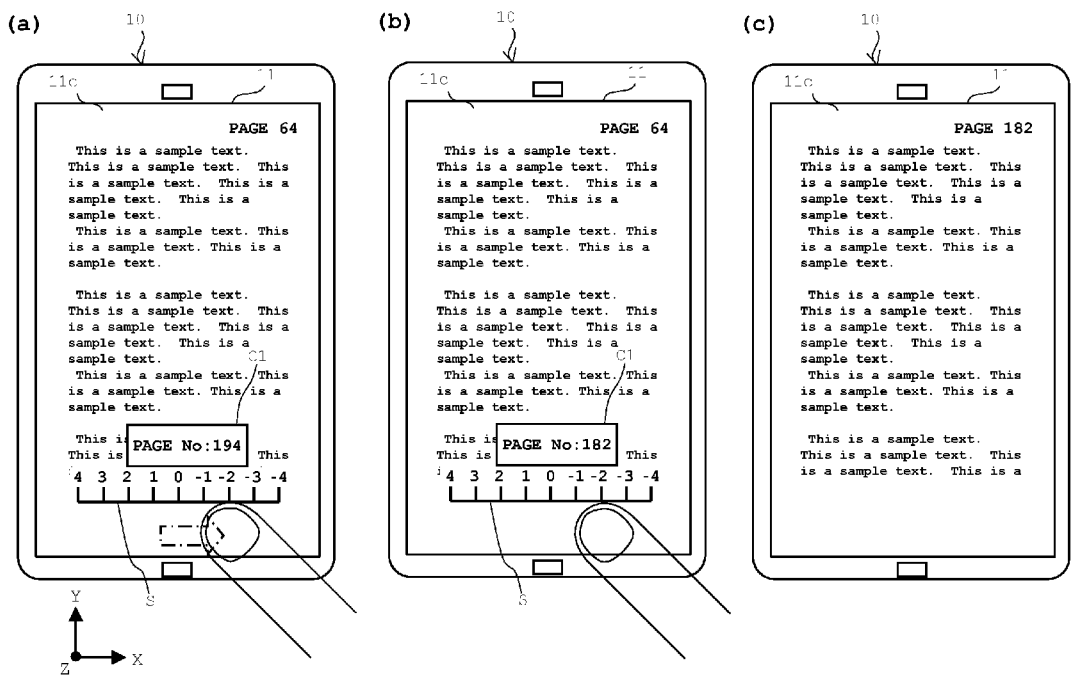
[FIG.15]

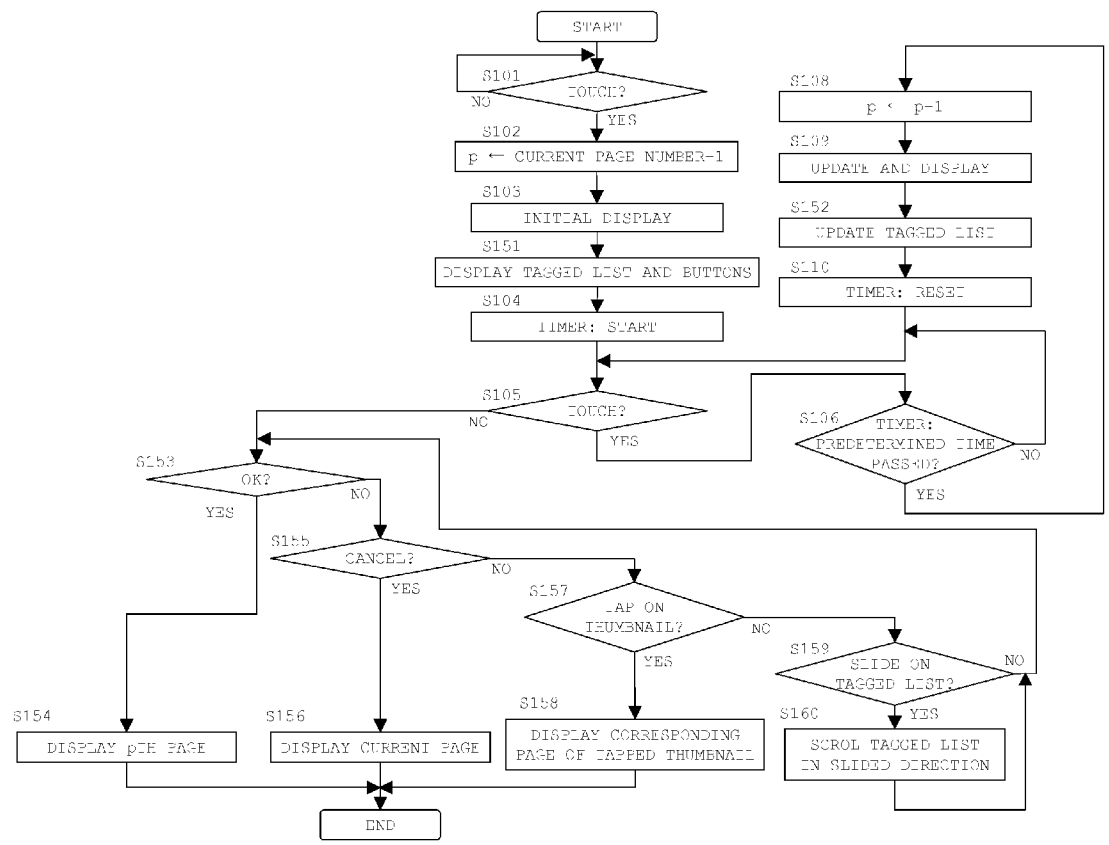
[FIG.16]

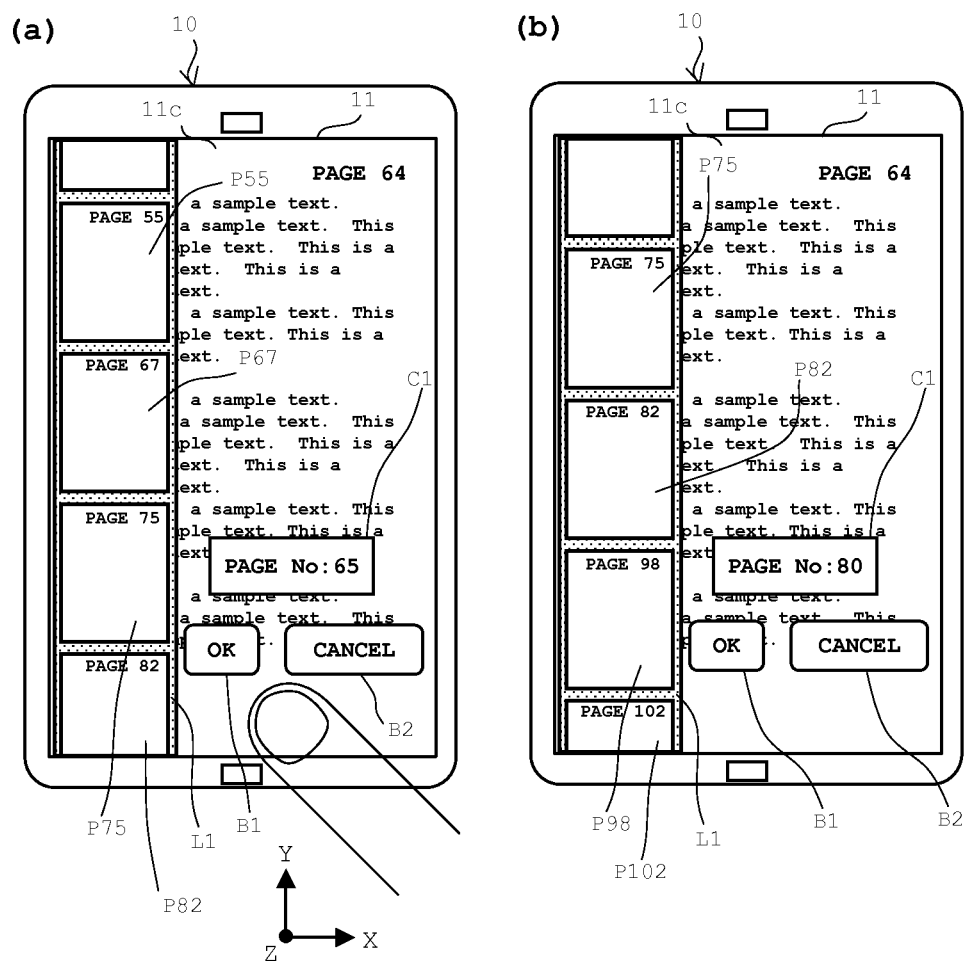
[FIG.17]

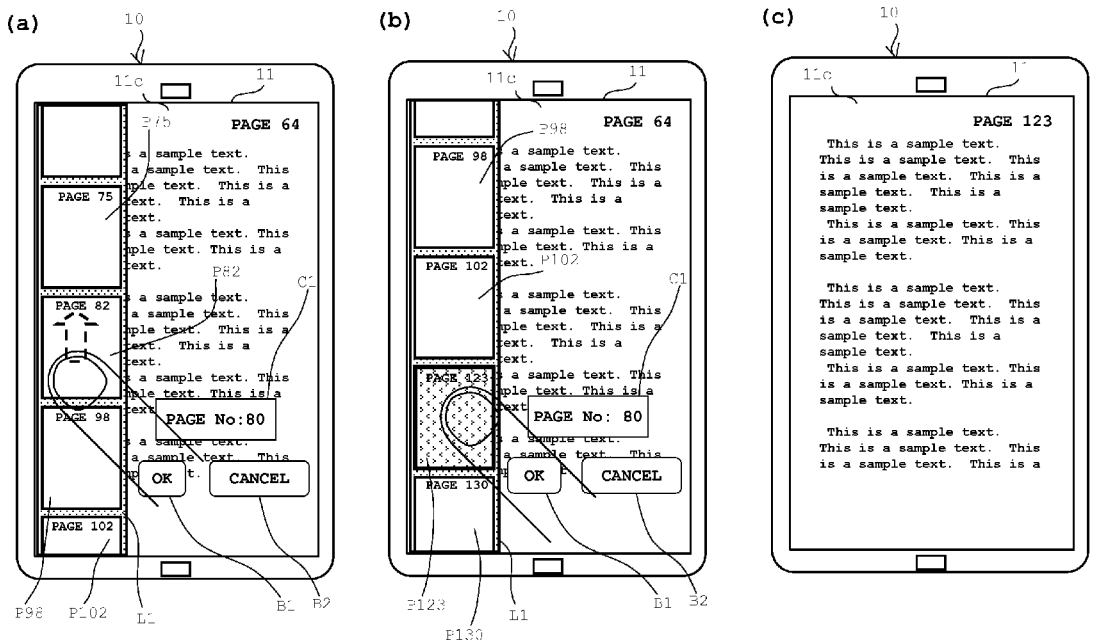
[FIG.18]

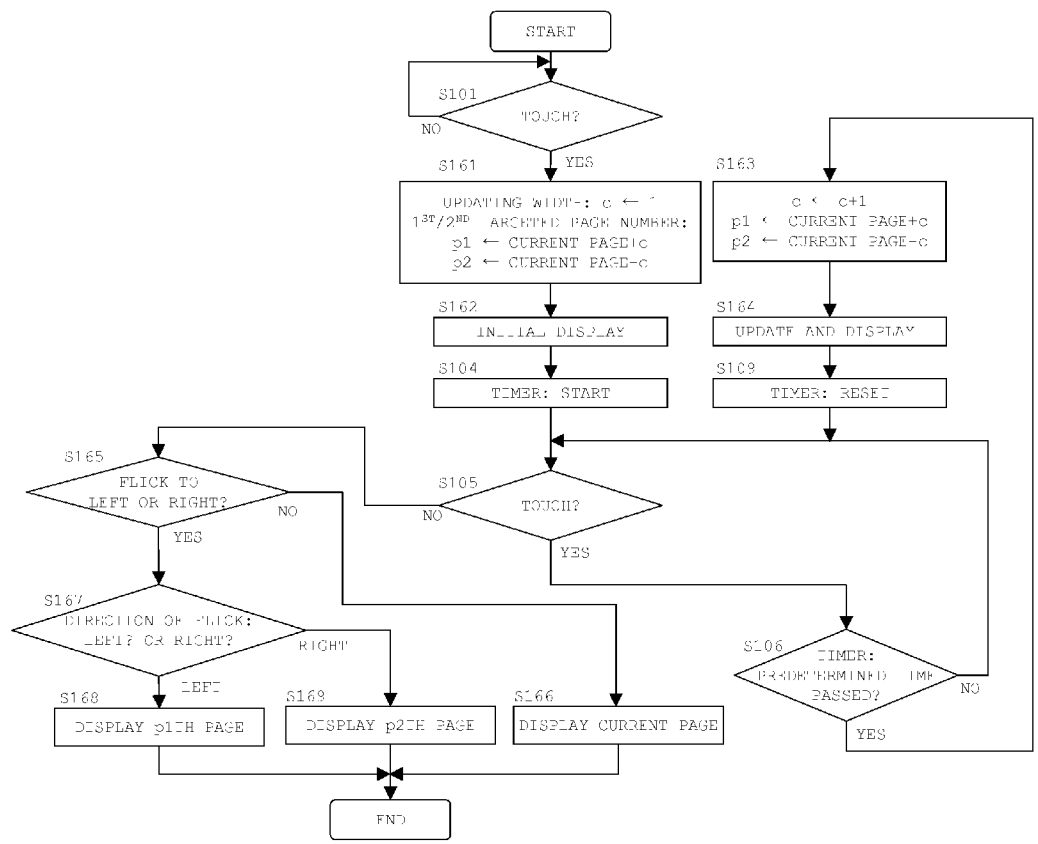
[FIG.19]

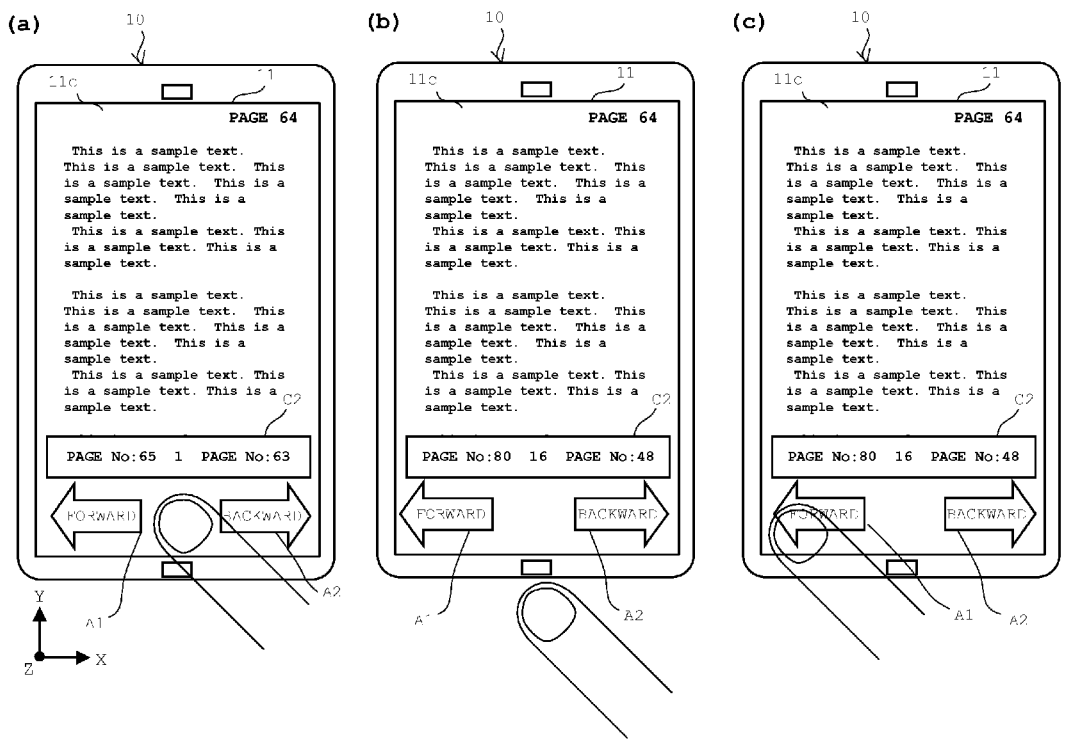
[FIG.20]

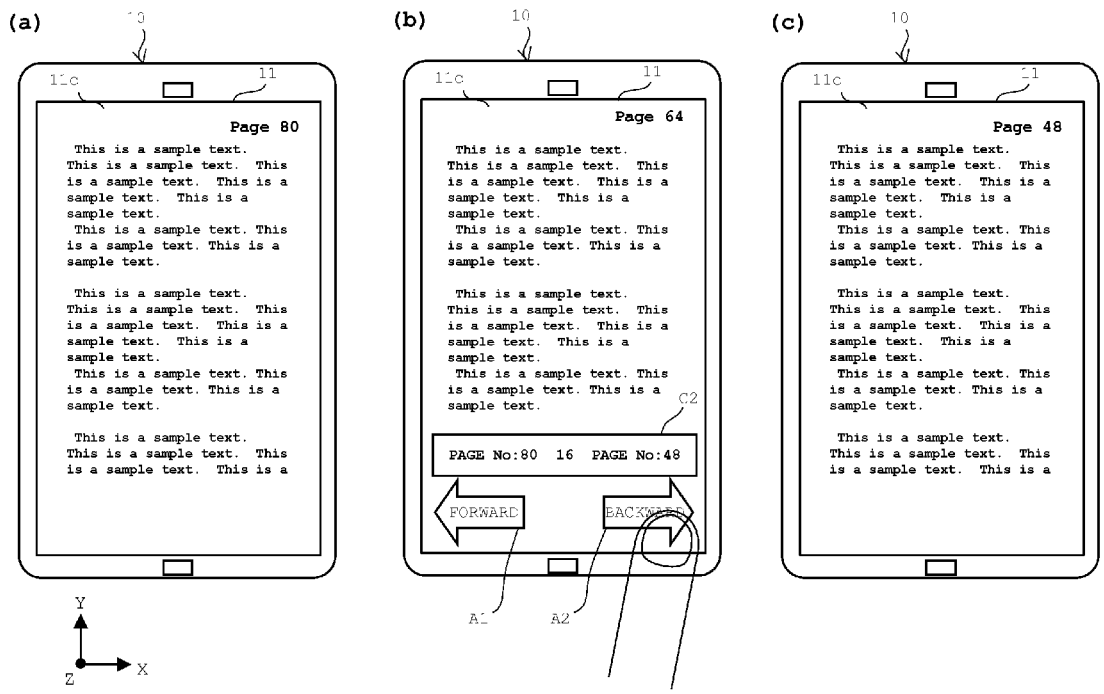
[FIG.21]

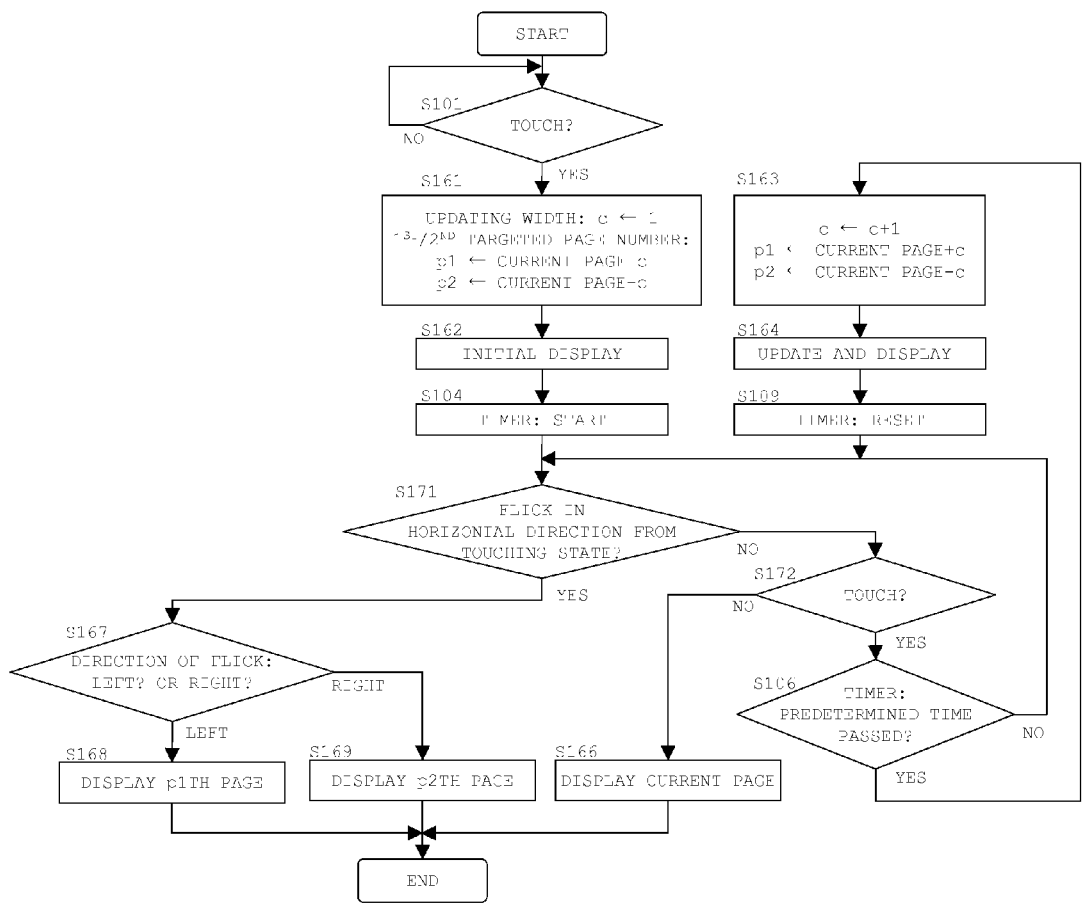
[FIG.22]

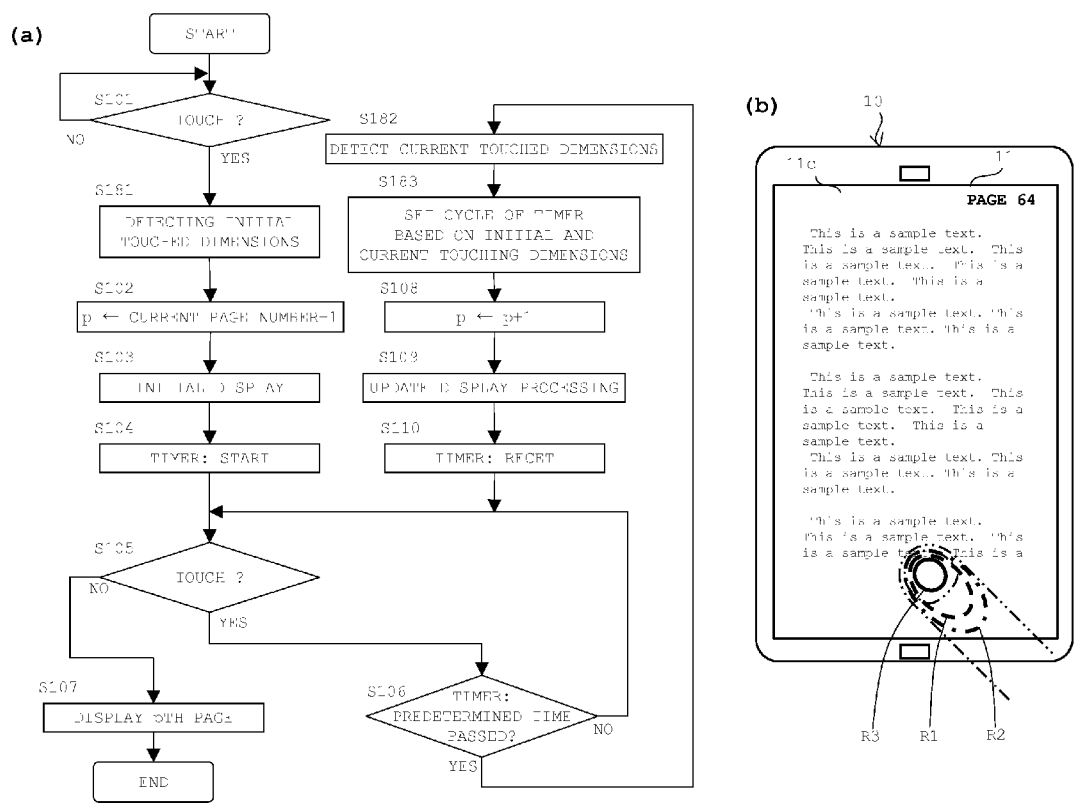
[FIG.23]

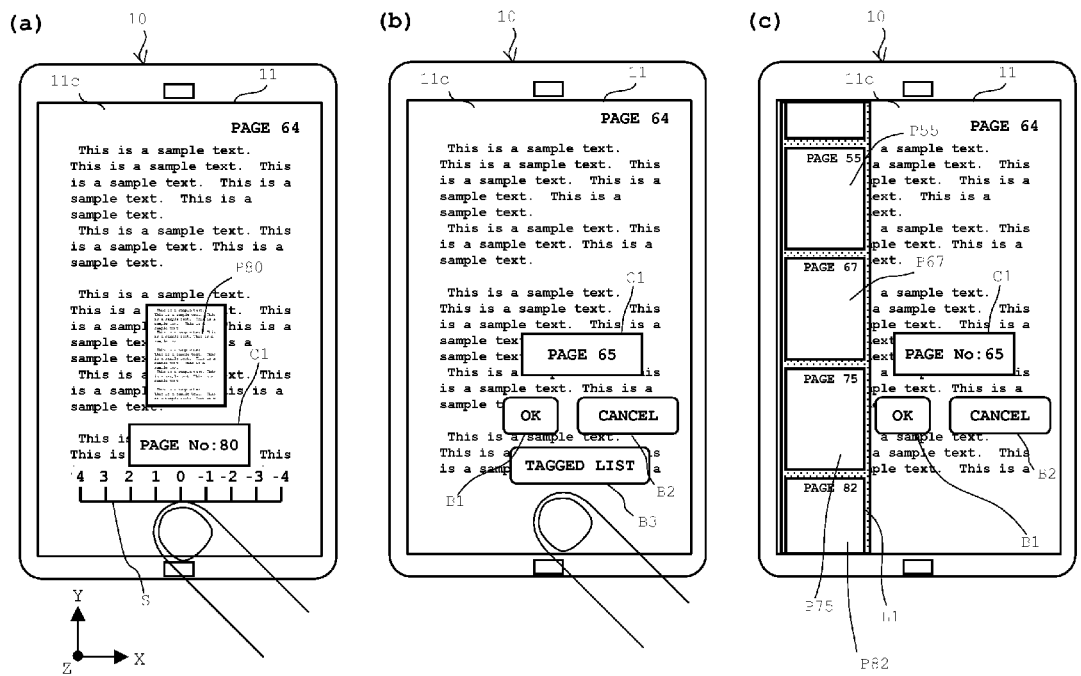
[FIG.24]

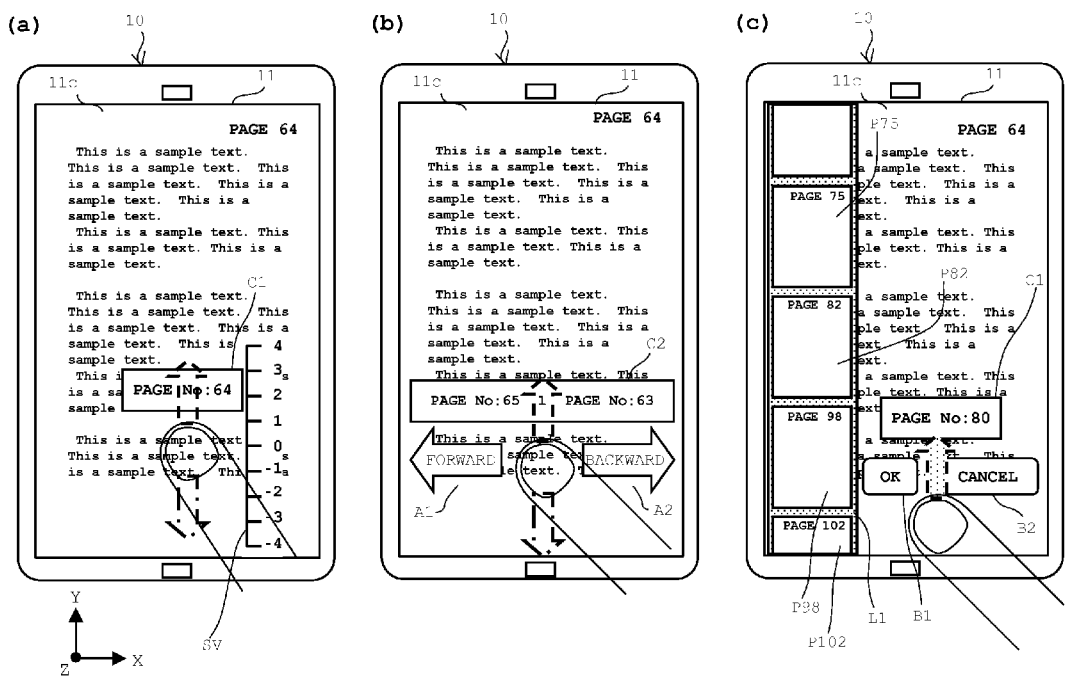
[FIG.25]

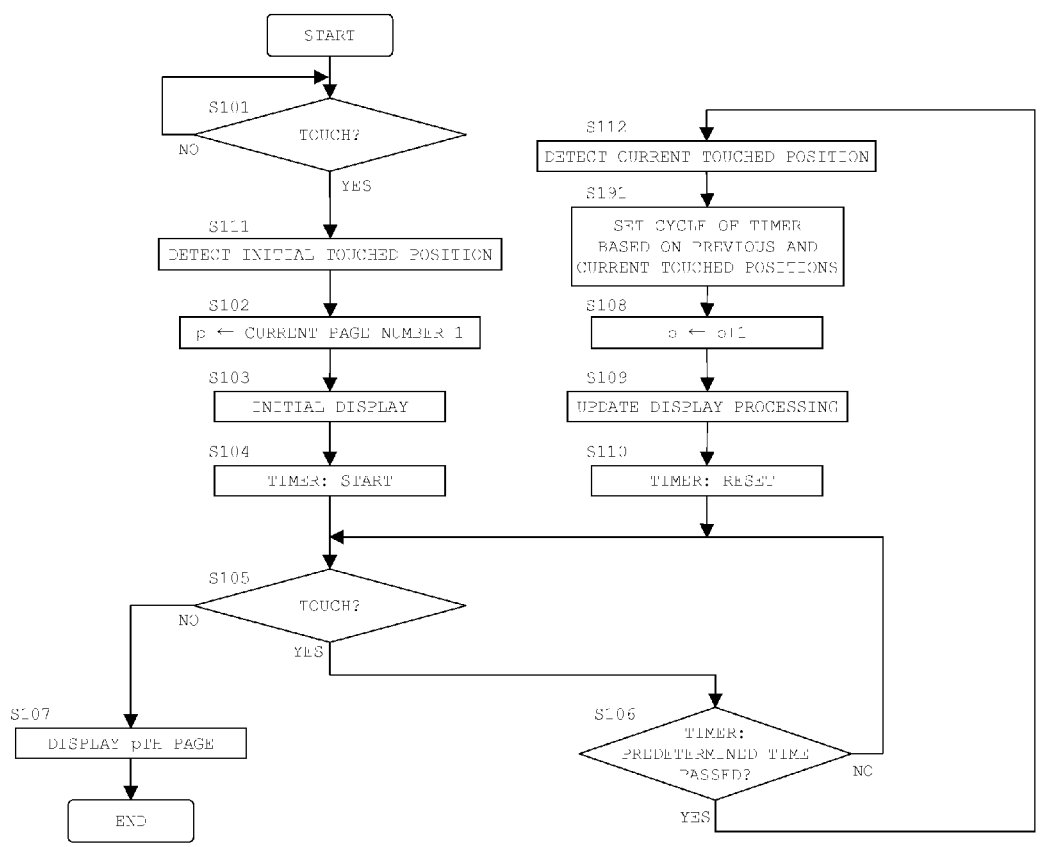
[FIG.26]

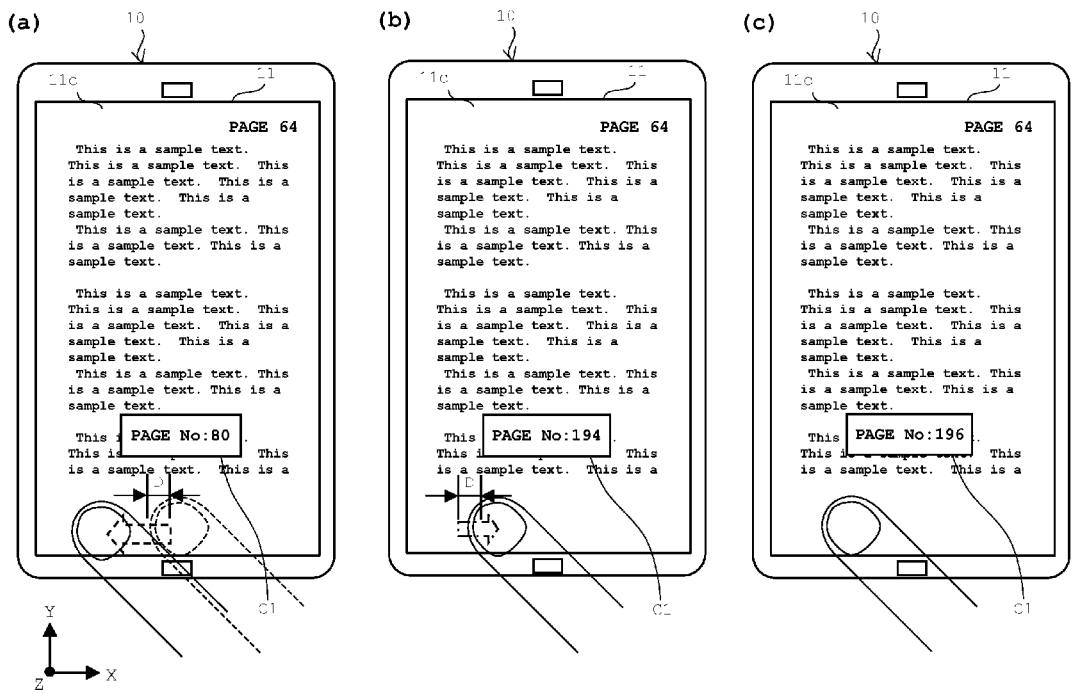
[FIG.27]

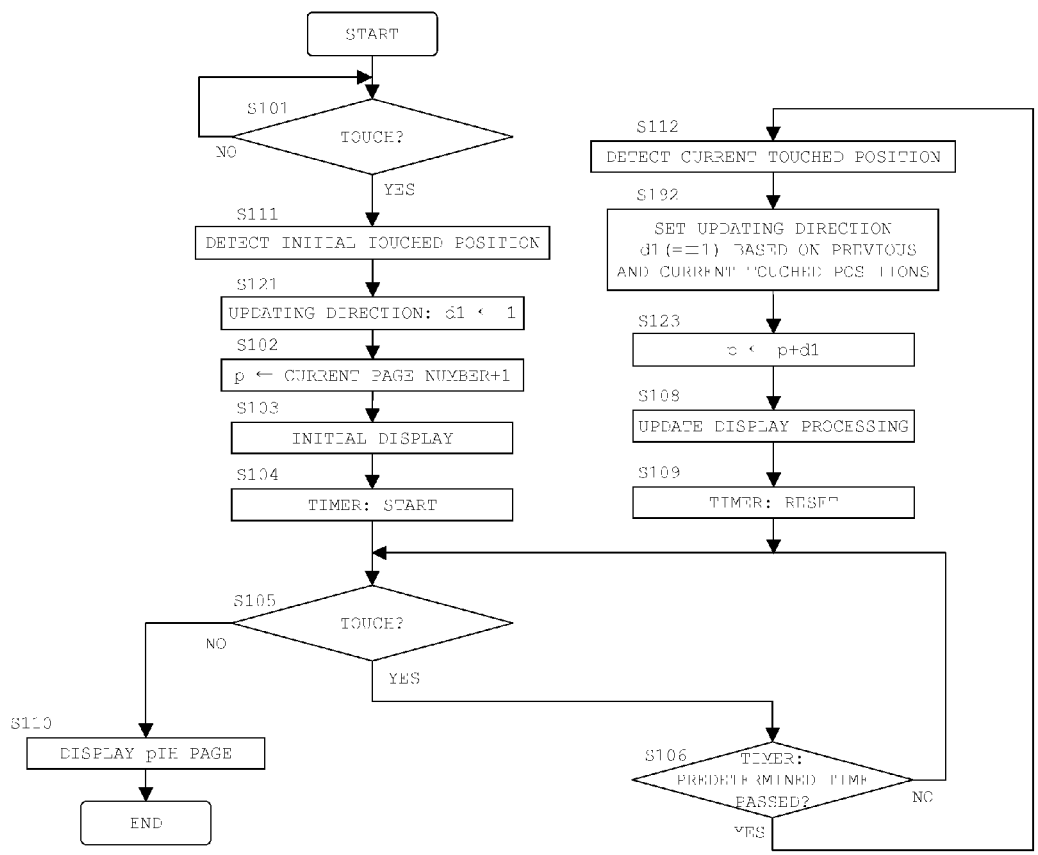
[FIG.28]

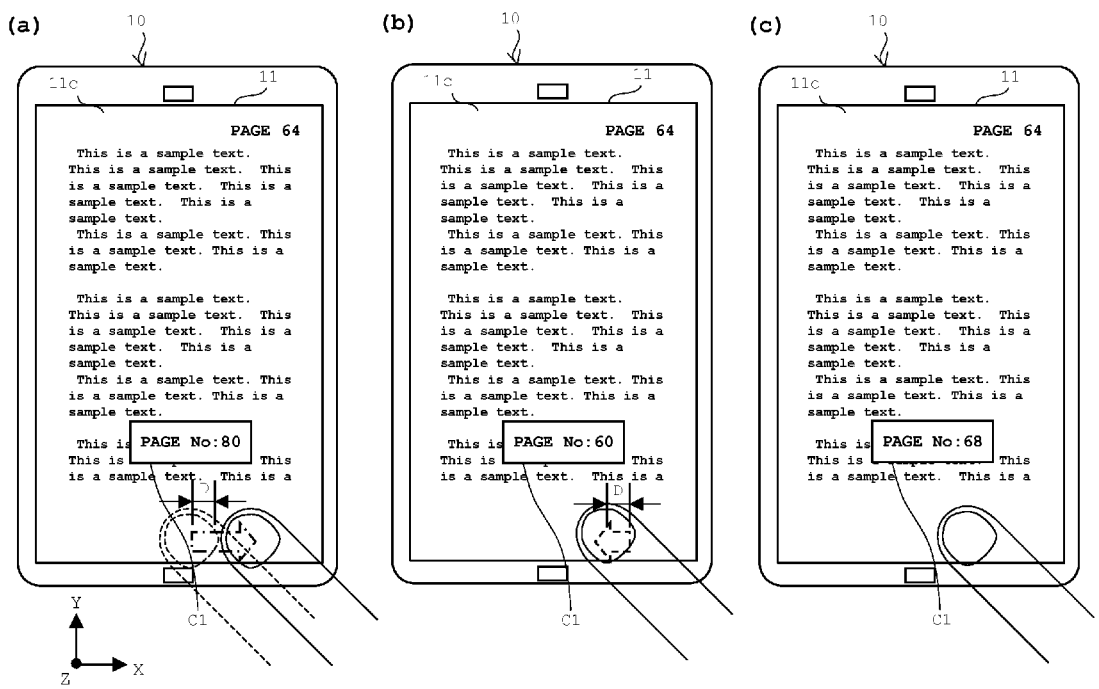
[FIG.29]

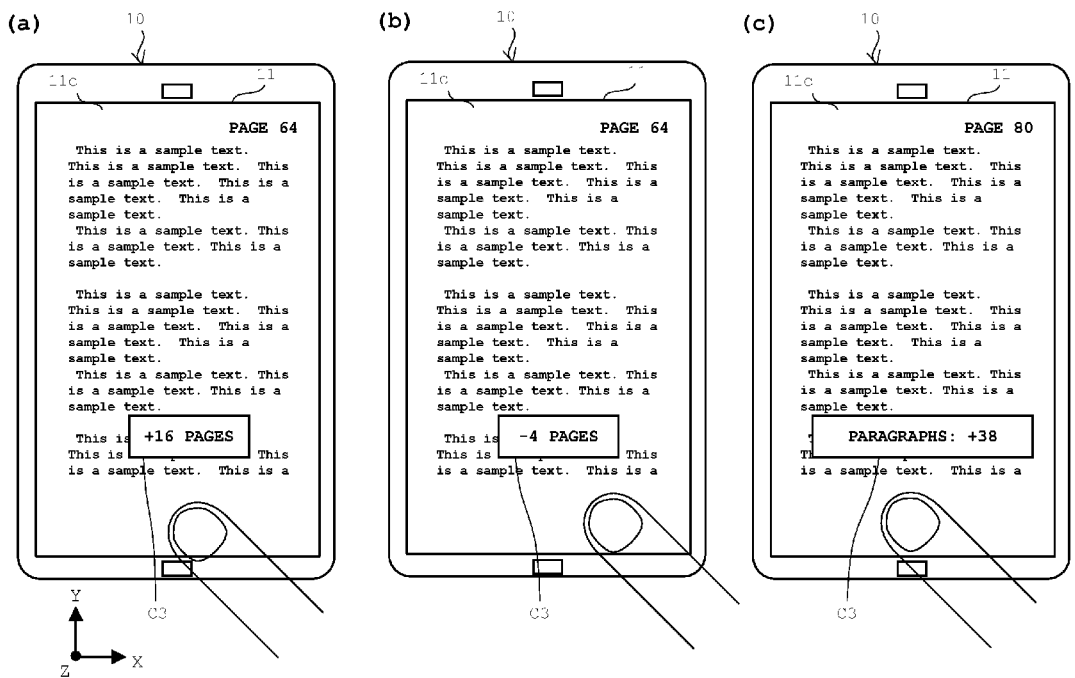
[FIG.30]

MOBILE TERMINAL DEVICE, STORAGE MEDIUM, AND DISPLAY CONTROL METHOD

TECHNICAL FIELD

The present invention relates to a mobile terminal device such as a cellular phone, a PDA (Personal Digital Assistant), a tablet PC, an e-book reader and so forth, and a storage medium and a display control method suitable for use in the mobile terminal device.

BACKGROUND ART

Conventionally, a mobile terminal device having touch panels executes various actions by operating on display surfaces. For example, with an operation on the display surface, a page of an electronic document is turned. With a predetermined operation, a previous page or a following page of a currently displayed page is displayed on the display surface.

Besides, a configuration that a user can turn a plurality of pages with a predetermined operation performed by the user is also proposed. For example, a configuration to change the number of pages turned based on the number of fingers touching the display surface is proposed.

SUMMARY OF INVENTION

Technical Problem

However, according to the above configuration, the user needs to touch the display surface with a plurality of fingers, therefore the user needs to hold the mobile terminal device with the other hand.

Also, in the above configuration, the number of pages turned at once is limited to the number of fingers of one hand. For this reason, the above configuration does not seem to suit for reading electronic documents with a lot of pages. It is desirable for a user to be able to turn the desired number of pages comfortably with an easy process even when the mobile terminal device is held with one hand.

A mobile terminal device, a program and a display control method that a user can comfortably perform turning pages of an electronic document displayed on a display surface is desired.

Solution to Problem

The mobile terminal device related to a first aspect of the present invention includes a display module, a detection module configured to detect an input with respect to the display module and a control module configured to control the display module. Here, in the case where a predetermined page of an electronic document is displayed on the display module, the control module updates, while an input is continuously detected by the detection module, an amount to be turned when pages of the electronic document are turned, and determines an amount to be turned by which the electronic document is turned based on the updated amount to be turned at a timing when the input is terminated.

A second aspect of the present invention relates to a storage medium which holds a computer program applied to a mobile terminal device. The mobile terminal device includes a display module having a display surface and a detection module configured to detect an input with respect to the display module. The computer program provides a computer of the mobile terminal device with functions of, in the case where a predetermined page of an electronic document is displayed on the display module, updating, while an input is continuously detected by the detection module, an amount to be turned when pages of the electronic document are turned, and determining an amount to be turned by which the electronic document is turned based on the updated amount to be turned at a timing when the input is terminated; and displaying a page of the electronic document which is obtained by turning pages from the predetermined page by the determined amount to be turned on the display module.

A third aspect of the present invention relates to a display control method of a mobile terminal device including a display module and a detection module configured to detect an input with respect to the display module. The display control method related to the present aspect includes steps of, in the case where a predetermined page of an electronic document is displayed on the display module, updating, while an input is continuously detected by the detection module, an amount to be turned when pages of the electronic document are turned; and determining an amount to be turned by which the electronic document is turned based on the updated amount to be turned at a timing when the input is terminated.

Advantageous Effects of Invention

According to the present invention, a user can comfortably perform turning pages of an electronic document displayed on a display surface.

An advantage or significance of the present invention will become clearer from descriptions of the embodiments, as shown below. However, the following descriptions of the embodiments are simply one illustration in embodying the present invention, and the present invention is not limited by what is described in the following descriptions of the embodiments.

BRIEF DESCRIPTION OF DRAWINGS

FIGS. 1(a) and 1(b) are diagrams showing an external arrangement of a cellular phone according to an embodiment.

FIG. 2 is a block diagram showing an overall configuration of the cellular phone according to the embodiment.

FIG. 3 is a diagram showing a page of an electronic document displayed on a display surface according to the embodiment.

FIG. 4 is a flow chart for explaining a procedure for processing according to the embodiment.

FIGS. 5(a) to 5(c) are diagrams showing screen display examples when a page turning processing is executed according to the embodiment.

FIG. 6 is a flow chart for explaining the procedure for processing according to a modification example 1.

FIGS. 7(a) to 7(c) are diagrams showing the screen display examples when the page turning processing is executed according to the modification example 1.

FIG. 8 is a flow chart for explaining the procedure for processing according to a modification example 2.

FIGS. 9(a) to 9(c) are diagrams showing the screen display examples when the page turning processing is executed according to the modification example 2.

FIGS. 10(a) to 10(c) are diagrams showing the screen display examples when the page turning processing is executed according to the modification example 2.

FIG. 11 is a flow chart for explaining the procedure for processing according to a modification example 3.

FIGS. 12(a) to 12(c) are diagrams showing the screen display examples when the page turning processing is executed according to the modification example 3.

FIG. 13 is a flow chart for explaining the procedure for processing according to a modification example 4.

FIGS. 14(a) to 14(c) are diagrams showing the screen display examples when the page turning processing is executed according to the modification example 4.

FIGS. 15(a) to 15(c) are diagrams showing the screen display examples when the page turning processing is executed according to the modification example 4.

FIG. 16 is a flow chart for explaining the procedure for processing according to a modification example 5.

FIGS. 17(a) and 17(b) are diagrams showing the screen display examples when the page turning processing is executed according to the modification example 5.

FIGS. 18(a) to 18(c) are diagrams showing the screen display examples when the page turning processing is executed according to the modification example 5.

FIG. 19 is a flow chart for explaining the procedure for processing according to a modification example 6.

FIGS. 20(a) to 20(c) are diagrams showing the screen display examples when the page turning processing is executed according to the modification example 6.

FIGS. 21(a) to 21(c) are diagrams showing the screen display examples when the page turning processing is executed according to the modification example 6.

FIG. 22 is a flow chart for explaining the procedure for processing according to a modification example 7.

FIG. 23(a) is a flow chart for explaining the procedure for processing according to a modification example 8 and FIG. 23(b) is a diagram showing the screen display example when the page turning processing is executed according to the modification example 8.

FIGS. 24(a) to 24(c) are diagrams showing the screen display examples when the page turning processing is executed according to other modification example.

FIGS. 25(a) to 25(c) are diagrams showing examples of an operation input with respect to a display surface when the page turning processing is executed according to the other modification example.

FIG. 26 is a flow chart for explaining the procedure for processing according to the other modification example.

FIGS. 27(a) to 27(c) are diagrams showing the screen display examples when the page turning processing is executed according to the other modification example.

FIG. 28 is a flow chart for explaining the procedure for processing according to the other modification example.

FIGS. 29(a) to 29(c) are diagrams showing the screen display examples when the page turning processing is executed according to the other modification example.

FIGS. 30(a) to 30(c) are diagrams showing the screen display examples when the page turning processing is executed according to the other modification example.

The drawings are entirely used for an explanation for an example of the embodiments, and not intended to limit a scope of the present invention.

DESCRIPTION OF EMBODIMENTS

In the following, regarding to the embodiments of the present invention will be described with reference to the drawings.

In the following explanation, a display 11 and a display surface 11c correspond to a "display module" recited in the claims. A touch sensor 12 corresponds to a "detection module" recited in the claims. A CPU 100 corresponds to a "control module" recited in the claims. A tagged list L1 corresponds to a "thumbnail table" recited in the claims.

FIGS. 1(a) and 1(b) are diagrams showing external arrangement of a cellular phone 1. FIGS. 1(a) and 1(b) are a front view and a side view, respectively.

The cellular phone 1 has a cabinet 10 including a front surface and a back surface. A touch panel is arranged on the front surface of the cabinet 10. The touch panel provides a display 11 to display an image and a touch sensor 12 being overlapped on the display 11.

The display 11 corresponds to a display module. The display 11 is composed of a liquid crystal panel 11a and a panel backlight 11b which illuminates the liquid crystal panel 11a (see FIG. 2). The liquid crystal panel 11a includes a display surface 11c to display the image, and the display surface 11c appears outside. On the top of the display surface 11c, the touch sensor 12 is arranged. Instead of the liquid crystal panel 11a, other display elements such as an organic EL, etc. can be used.

The touch sensor 12 is formed to be a transparent sheet shape. The display surface 11c can be seen through the touch sensor 12. The touch sensor 12 provides a first transparent electrode and a second transparent electrode, which are arranged in a matrix state, and a cover. The touch sensor 12 detects a position on the display surface 11c where the user touched (hereinafter, referred to as an "input position") by detecting changes in capacitance between the first and the second transparent electrodes and outputs a positional signal according to its input position to a later explained CPU 100. The touch sensor 12 corresponds to a receiving module which receives an input by a user to the first display surface 11c. The touch sensor 12 is not limited to the capacitance style touch sensor 12, but it can be the touch sensor 12 of an ultrasonic, a pressure-sensitive, a resistance film or a photodetecting style, etc.

The user touches the display surface 11c means, for example, that the user performs an operation of touching, sliding, tapping, flicking, etc. on the display surface 11c by a finger or a contact member such as a pen and so on (for simplification, hereinafter, simply refer to a "finger"). Also, touching the display surface 11c means, in fact, touching an area where an image is projected on the display surface 11c on the surface of the cover overlapping the touch sensor 12. The "sliding" is an action moving the finger while the finger is touching the display surface 11c. The "tapping" is an action that the user touches a section on the display surface 11c with a finger and releases the finger in a short period of time as the user dabs the display surface 11c with the finger. The "flicking" is an action that the user flips the display surface 11c with a finger quickly, and that the user touches the display surface 11c with a finger, moves the finger more than a predetermined distance in a short time and releases the finger.

On the front surface of the cabinet 10, a microphone 13 and a speaker 14 are arranged. The user can talk on the phone by receiving a voice from the speaker 14 with an ear and by letting out the voice to the microphone 13.

On the back of the cabinet 10, a lens window of a camera module 15 (see FIG. 2) is arranged. An image of a subject is taken from the lens window into the camera module 15.

FIG. 2 is a block diagram showing the overall configuration of the cellular phone 1.

In addition to the components described above, the cellular phone 1 of the embodiment includes a CPU 100, a memory 200, a video encoder 301, an audio encoder 302, a communication module 303, a backlight drive circuit 304, a video decoder 305, an audio decoder 306, and a clock 307.

The camera module 15 includes an imaging module which has an imaging element such as a CCD, etc., and takes images. The camera module 15 digitizes an imaging signal output from the imaging element, subjects the imaging signal to various corrections such as gamma correction, etc., and outputs the imaging signal to the video encoder 301. The video encoder 301 encodes the imaging signal from the camera module 15 and outputs the imaging signal to the CPU 100.

The microphone 13 converts collected sound into an audio signal and outputs the audio signal to the audio encoder 302. The audio encoder 302 not only converts an analog audio signal from the microphone 13 into a digital audio signal, but also encodes the digital audio signal to output the CPU 100.

The communication module 303 converts information from the CPU 100 into a radio signal and transmits the radio signal to a base station via an antenna 303a. Also, the communication module 303 converts a radio signal received via the antenna 303a into information and outputs the information to the CPU 100.

The backlight drive circuit 304 supplies a drive signal based on a control signal from the CPU 100 to the panel backlight 11b. The panel backlight 11b is turned on by a drive signal from the backlight drive circuit 304 and illuminates the liquid crystal panel 11a.

The video decoder 305 converts video signals from the CPU 100 into analog or digital video signals which can be displayed on the liquid crystal panel 11a, and outputs these signals to the liquid crystal panel 11a. The liquid crystal panel 11a displays an image corresponding to the video signal on the display surface 11c.

The audio decoder 306 decodes an audio signal and a tone signal of various notifying sounds such as a ring tone or alarm sound, etc., from the CPU 100, further converts the audio signal and the tone signal into an analog audio signal and an analog tone signal, and outputs the signals to the speaker 14. The speaker 14 reproduces voice and a tone signal, etc., from the audio signals and tone signals from the audio decoder 306.

The clock 307 measures time and outputs a signal according to the measured time to the CPU 100.

The memory 200 is a storing module including ROM and RAM. The memory 200 stores a control program for providing the CPU 100 with a control function. Also, the memory 200 stores an application program (hereinafter, referred to as an "application") to read Electronic Documents. In the present invention, the electronic document means a contents of any readable electronic medium. By being displayed on a display device such as a liquid crystal display, etc., the electronic document can be read by a user. The electronic documents include electronic books.

Besides, the memory 200 is also used as a working memory of the CPU 100. That is, the memory 200 stores data temporally used or generated by the CPU 100 when various application programs such as a telephone call function, an electronic documents reading function, etc., are executed. For example, the memory 200 stores information related to an input position of a touch on the display surface 11c, a page number of a page of electronic document displayed on the display surface 11c, an image of each page (hereinafter, referred to as an "page screen"), thumbnail images (hereinafter, referred to as "thumbnails") of the page screen, etc.

The CPU 100 drives each module constructing the cellular phone 1 such as the microphone 13, the communication module 303, the panel backlight 11b, the liquid crystal panel 11a, the speaker 14, etc., based on the control program executed, according to an input signal from the touch sensor 12, the video encoder 301, the audio encoder 302, the communication module 303, the clock 307. The CPU 100 executes various applications by controlling each module of the cellar phone 1.

The CPU 100 controls a display 11 based on information, etc., input through the touch sensor 12 from the user as a control module. For example, the CPU 100 displays images on the display surface 11c of the liquid crystal panel 11a by outputting the image signal to the image decoder 305 based on the input information.

The CPU 100 detects information related to a touch with respect to the display surface 11c done by the user based on the positional signal input from the touch sensor 12. For example, the CPU 100 detects a position touched on the display surface 11c (hereinafter, referred to as a "touched position") and a dimensions (hereinafter, referred to as a "contact dimensions") of an area where the finger is touching the display surface 11c by the touch (hereinafter, referred to as an "input area").

FIG. 3 is a diagram for explaining a display screen while the application to read the electronic document is executed. In FIG. 3, page 64 of the electronic document is displayed on the display surface 11c. On the top right corner of the display surface 11c, a string of letters of "page 64" are displayed to notify the user of the page number (hereinafter, referred to as a "current page number") of a currently displayed page (hereinafter, referred to as "current page"). Here, "page n is displayed" means that the page screen of a page whose page number is n is displayed on the display surface 11c.

The CPU 100 generates a page screen of a page of an electronic document targeted to be displayed based on data of the electronic document read out from the memory 200 and displays the page screen on the display surface 11c.

The CPU 100 executes a page turning processing later explained in a state where a page of the electronic document is displayed on the display surface 11c. The page turning processing is a process for turning pages of the electronic document. That is, the page turning processing is the process for updating the current page number according to the touch to the display surface 11c and for displaying the page corresponding to the newly set page number on the display surface 11c.

The data of the electronic document does not always need to be stored in the memory 200. Besides, the page screen of each page does not need to be generated by the CPU 100. For example, data related to an electronic document can be obtained through the communication module 303.

<A Procedure for the Present Embodiment>

FIG. 4 is a flow chart for explaining a procedure for a page turning processing. FIGS. 5(a) to 5(c) are diagrams for explaining display screens when the page turning processing shown in FIG. 4 is executed.

As described later, a targeted page number p is updated based on the page turning processing of FIG. 4. After the update, in a process of last step of page turning processing (S107), page p is displayed on the display surface 11c.

Referring to FIG. 4, the CPU 100 first determines whether the display surface 11c is touched or not (S101). When the display surface 11c is touched (S101: YES), the CPU 100 sets p0+1 on a targeted page number p (S102). Here, a constant p0 is the current page number.

In a step S103, the CPU 100 displays a targeted page number p in a targeted page number display column C1 provided on the display surface 11c as an initial display. In a state that page 64 is displayed as in FIG. 3, when the display surface 11c is touched by the user's finger, a number 65 (=64+1) is displayed on the targeted page number display column C1.

Since the targeted page number display column C1 displays the targeted page number p to be updated to notify the user, the targeted page number display column C1 is arranged on a little upper side of the touched position on the display surface 11c. The image of the current page is displayed on a background of the targeted page number display column C1.

In a step S104, the CPU 100 starts a timer. The CPU 100 measures elapsed time T by driving a timer based on a signal from the clock 307. An initial value of the elapsed time T is 0.

In a step S105, the CPU 100 determines whether the display surface 11c is currently touched or not (S105). When the display surface 11c is touched (S105: YES), the CPU 100 progresses to the next processing of a step S106.

In the step S106, the CPU 100 determines whether the elapsed time T has reached to a predetermined time T0 (hereinafter, referred to as an "updating cycle") or not. The updating cycle T0 is, for example, from a few dozen milliseconds to a few seconds.

When T<T0 state is given (S106: NO), the CPU 100 returns to the processing of the step S105. While T<T0 state is given, the CPU 100 executes the processing of the step S105 repeatedly.

In the step S105, when the display surface 11c is not touched (S105: NO), the CPU 100 displays the page p on the display surface 11c (S107). When the processing of the step S107 is completed, the page turning processing of FIG. 4 is terminated.

Here, when a user wants to turn a page, right after the processing of an initial display of a step S103 is performed as in FIG. 5(a), a finger can be released from the display surface 11c. In this case, since the finger is released before the elapsed time T passes the updating cycle T0, if the current page is page 65, with the processing of the step S107, the page 65 is displayed on the display surface 11c. Therefore, the user can turn one page if s/he taps on the display surface 11c.

As explained below, in the page turning processing of the present embodiment, not only one page, but also a plurality of pages can be turned if the user touched the display surface 11c for a certain time.

In a step S106, when determining that the elapsed time T is reached the updating cycle T0, that is, when T≥T0 state is given (S106: YES), the CPU 100 progresses to the processing of the step S108. The CPU 100 increases the targeted page number p by 1 (S108). Next, the CPU 100 updates the targeted page number p displayed on the targeted page number display column C1 to an updated new current targeted page number p and displays it (S109). Then, the CPU 100 resets the timer driving (S110). Because the timer is reset, the elapsed time T is set to the initial value 0 again. The CPU 100 measures the time until the targeted page number p is updated again (S108). When a processing of a step S110 is completed, the CPU 100 progresses to the step S105.

Thus, when the touch is continued from the start of the page turning processing of FIG. 4, for each updating cycle T0, the processings of the steps S108-S110 are executed repeatedly, and the targeted page number p is added one by one and updated. For example, when the touch is further continued from a state of FIG. 5(a) (p=65), the targeted page number p increases gradually. Then, for instance, as shown in FIG. 5(b), the number 80 is displayed on the targeted page number display column C1.

When the finger is released from the display surface 11c (S105: NO), the CPU 100 displays the page of the updated targeted page number p (S107). Thus, as in FIG. 5(b), if the targeted page number p is 80 when the finger is released from the display surface 11c, page 80 is displayed on the display surface 11c as in FIG. 5(c).

According to the present embodiment, while a certain position on the display surface 11c is touched, the CPU 100 updates the targeted page number p. That is, while a certain part of the display surface 11c is being touched, an amount to be turned when the page of the electronic document is turned, that is, the number of pages to be turned is updated. When the touch is no longer detected, the amount to be turned is determined, and the page p is displayed on the display surface 11c. That is, the user can turn a plurality of pages by just touching the display surface 11c with one finger. Thus, the user can comfortably perform turning pages of the electronic document on the display surface 11c. Even when the user is holding the cellular phone 1 with one hand, the user can easily turn the desired number of pages using one finger of the other hand.

Modification Example 1

In the above embodiment, the updating cycle T0 of the targeted page number p is constant. That is, while the touch by the user is continued, the targeted page number p increases at a constant rate. On the other hand, in a modification example 1, the updating cycle T0 is changed according to a slide by the user. With the change of the updating cycle, the user can adjust updating rate of the targeted page number p (1/T0) (hereinafter, referred to as an "updating rate") to the desired speed.

FIG. 6 is a flow chart for explaining the procedure for the page turning processing according to the present modification example. The flow chart of FIG. 6 is the flow chart which is added a processing of a step S111 between steps of S101 and S102 of the flow chart shown in FIG. 4 and processings of steps S112 and S113 before the step S108.

In the step S111, the CPU 100 detects the touched position detected at the step S101, that is, the touched position of the touch first performed by a user for the page turning as the initial touched position.

In the step S112, the CPU 100 detects the touched position currently being touched as the current touched position.

In the step S113, the CPU 100 sets the updating cycle T0 based on how much the current touched position sifted from the initial touched position in horizontal direction (X axis direction). The CPU 100 sets the updating cycle T0 as a predetermined initial value when the current touched position and the initial touched position are located at about the same position in the X axis direction. When the current touched position is located on the left side compared to the initial touched position (X axis negative direction), the CPU 100 sets the updating cycle T0 to be a smaller value than the initial value. When the current touched position is located on the right side (X axis positive direction) compared to the initial touched position, the CPU 100 sets the updating cycle T0 to be a bigger value than the initial value.

In concrete, the CPU 100 compares the X axis coordinate (referred to as X0 (unit is pixel)) of the initial touching position and the X axis coordinate (referred to as X1) of the current touched position. When X0−D≤X1≤X+D, the updating cycle T0 is set to be the initial value. When X>X0+D, the updating cycle T0 is set to be twice the value of the initial value. When X<X0−D, the updating cycle T0 is set to be a half of the initial value. Here, D is a predetermined threshold value.

To reduce a risk of incorrect operations being caused by slightly moving the touched position, a predetermined value D can be set to be big. Or, even if the amount being moved of the touched position is small, for the user to be able to change the updating cycle T0, the predetermined value D can be set to be small.

The procedure for the processing according to the present modification example is explained using FIGS. 5(a), 5(b) and 7(a) to 7(c) below. FIGS. 7(a) to 7(c) are diagrams for explaining the display screens when the page turning processing is executed according to the present modification example.

As in FIG. 5(a), when the display surface 11c is touched, in the step S111, the initial touched position is detected. When the touch is kept without any changes in position touched, the current touched position detected in the step S112 is almost the same with the initial touch. In this case, in the step S113, as described above, the updating cycle T0 is set at the predetermined initial value. Thus, since the steps S108-S110 and S112-S113 are executed repeatedly, the targeted page number p increases one by one at a constant rate. For example, as sown in FIG. 5(b), the targeted page number p is increased from 65 to 80.

Also, as in FIG. 5(b), when the targeted page number p is set to 80, the user can move the touched position in a left direction as shown by a finger and an arrow framed by a dashed line of FIG. 7(a). In this case, based on the detected initial touched position and the current touched position, as in the above, the updating cycle T0 is set small in the step S113. Since the updating cycle T0 is set small, the updating rate of the targeted page number is accelerated. Therefore, compared to the case where the current touched position and the initial touched position are almost identical, the targeted page number p set to 80 is set to 194, for instance, in a short time. In this case, as shown in FIG. 7(b), a number 194 is displayed in the targeted page number display column C1. The user's finger touched while the display of FIG. 7(b) is displayed is released, as shown in FIG. 7(c), the page 194 is displayed on the display surface 11c.

Also, the user's finger touched while the display of FIG. 5(b) is displayed may be moved to the right side (see the arrow of a chain line of FIG. 7), compared to the initial touched position. In this case, in the step S113, the updating cycle T0 is set bigger than the initial value. Since the updating cycle T0 is set bigger than the initial value, compared to the time the user's finger is on the initial touched position, the updating rate of the targeted page number is reduced.

According to the configuration of the present modification example, the user can accelerate the updating rate of the targeted page number p by moving the current touched position to the left side compared to the initial touched position.

Therefore, the user can display the desired page in shorter time with a simple operation by one finger.

Also, according to the configuration of the present modification example, the user can slow down the updating rate of the targeted page number p by moving the current touched position to the right side compared to the initial touched position.

Therefore, the user can easily perform visual confirmation of the currently set targeted page number p by slowing down the updating rate of the targeted page number p. Further, the user can easily perform a releasing action for displaying the desired page. That is, by slowing down the updating rate of the targeted page number p, the user can easily release the finger when the page number of the page the user wishes to display is displayed on the targeted page number display column C1.

In the present modification example, while the display surface 11c is touched, the user can change the updating rate of the targeted page number p at any timing by performing the sliding operation. Thus, even if the user does not set the updating rate of the targeted page number in advance, the user can perform the page turning operation comfortably while changing the rate freely with a simple operation by one finger.

Modification Example 2

In the above embodiment, the targeted page number is always updated to increase. In a modification example 2, the targeted page number is updated, in addition to increase, by decreasing according to the touched position touched by the user.

FIG. 8 is a flow chart for explaining the procedure for the page turning processing according to a modification example 2. The flow chart of FIG. 8 is what the processings of steps S111 and S121 are added between the steps S101 and S102 of the flow chart shown in FIG. 4, and the processings of steps S112, S122 and S123 are added between the steps S106 (S106: YES) and S108. The processings of S111 and S112 in FIG. 8 are the same as the processings of S111 and S112 explained in FIG. 6, respectively.

In the step S121, the CPU 100 assigns the initial value 1 to an updating direction d1 which is a variable. As described later, the updating direction d1 is set to be 1 or −1 according to the initial touched position and the current touched position. When d1=1, the targeted page number p is set to be increased, and when d1=−1, the targeted page number p is set to be decreased (see later explained S123).

In the step S122, the CPU 100 updates the updating direction d1 based on the initial touched position and current touched position. For example, the CPU 100 sets the updating direction d1 to 1 when the current touched position locates at about the same position or more left side position than the initial touched position in the horizontal direction. Also, the CPU 100 sets the updating direction d1 to −1 when the current touched position locates at more right side position than the initial touched position in the horizontal direction.

In concrete, the CPU 100 compares the X axis coordinate (set to X0 (the unit is the pixel)) of the initial touched position with the X axis coordinate (set to X1) of the current touched position. When X1≤X0+D, the updating direction d1 is set to 1. When X1>X0+D, the updating direction d1 is set to −1.

To reduce induction of incorrect operation by slightly moving the touched position, the predetermined value D may be set to big. Also, even if the moving amount of the touched positions is small, for the user to be able to change the updating direction easily, the predetermined value D can be set to small.

In the step S123, the CPU 100 updates and sets the targeted page number p to p+d1. That is, when d1=1, the targeted page number p is updated to p+1, and when d1=−1, the targeted page number p is updated to p−1.

FIGS. 9(a) to 9(c) and FIGS. 10(a) to 10(c) are diagrams for explaining display screens when the page turning processing is executed according to the current modification example.

In a state the page 64 is displayed as in FIG. 3, when the display surface 11c is touched, as shown in FIG. 9(a), the number 65 (=64+1) that is the targeted page number p is displayed on the targeted page number display column C1.

While the touch is being continued, there is a time when the current touched position is almost the same as the initial touched position detected at the step S111 in the horizontal direction. In this case, in the step S122, d1 is set to 1. In the step S123, the targeted page number p increases 1 because of the update. In a state where d1=1, if the updates are made repeatedly so as the targeted page number p to increase 1, for instance, as in FIG. 9(b), the targeted page number p is set to 80.

As in FIG. 9(b), in a state where the targeted page number p is set to 80, when the finger is released from the display surface 11c, as in FIG. 9(c), the page 80 is displayed.

As in FIG. 9(b), the targeted page number p is set to 80, and the current touched position is in a state where it locates at almost the same position as the initial touched position, as in FIG. 10(a), the touched position can be moved to a right side direction (X axis positive direction) by sliding a finger. In this case, in the step S122, the updating direction d1 is set to −1. Since the updating direction d1 is set to −1, in the step S123, the targeted page number p decreases 1 by the update. When a touch is continued while the touched position shown in FIG. 10(a) is kept, the targeted page number p is repeatedly updated by reducing one by one. For example, as shown in the targeted page number display column C1 of FIG. 10(b), the targeted page number p is set to 60.

In a state that the targeted page number p is set to 60 as in FIG. 10(b), when the finger is released from the display surface 11c, as shown in FIG. 10(c), the page 60 is displayed on the display surface 11c.

According to the present modification example, the user can increase the targeted page number p by moving the display surface 11c touching finger to the position almost the same with the initial touched position or further left side of the initial touched position. Based on the increase of the targeted page number p, the page is turned forward. Also, the user can reduce the targeted page number p by moving the display surface 11c touching finger to the right side of the initial touched position. Based on the reduction of the targeted page number p, the page is turned backward. Furthermore, the user can switch the updating direction (a sign of d1) of the targeted page number p, that is, whether to increase or decrease the targeted page number p at any timing.

Thus, the user can perform setting the targeted page number of the page to be displayed on the display surface 11c comfortably by changing the increase or decrease of the amount to be turned freely, and it is further convenient.

Modification Example 3

In the above embodiment, when the display surface 11c is no longer touched, the page corresponding to the targeted page number (hereinafter, referred to as "targeted page") is displayed at once. In contrast, in the modification example 3, before the targeted page is displayed on the display surface 11c, the user can choose whether or not to allow to display the targeted page. As described later, when the user chooses whether the user allows or cancels, the thumbnail of the targeted page is displayed on the display surface 11c.

FIG. 11 is a flow chart for explaining the procedure for processing of the page turning processing according to the present modification example. The flowchart of FIG. 11 is the flow chart which is added a processing of a step S131 between steps S103 and S104 of the flow chart shown in FIG. 4 and processings of steps S132-S135 after the step S105.

FIGS. 12(a) to 12(c) are diagrams for explaining the display screen when the page turning processing shown in FIG. 11 is executed.

When the CPU 100 completes an initial display of displaying the targeted page number p on the display surface 11c (S103), the CPU 100 displays an OK button B1 and a CANCEL button B2 on the display surface 11c (S131). The OK button B1 is a button to allow the display of the targeted page. The CANCEL button B2 is for canceling the display of the targeted page. As shown in FIG. 12(a), the number 65, that is the targeted page number p, is displayed in the targeted page number display column C1 provided at the top of the touched position. Then, the OK button B1 and the CANCEL button B2 are displayed on the display surface 11c in such a manner as to align laterally (X axis direction). The OK button B1 and the CANCEL button B2 are displayed between the touched position and the targeted page number display column C1.

From the moment the display surface 11c is touched (S101: YES) and until the finger is released (S105: NO), the CPU 100 executes the processings of the steps S108-S109 repeatedly as the same with the processing shown in the flow chart of FIG. 4.

When the finger is released (S105: NO), the CPU 100 displays a thumbnail of the set targeted page on the display surface 11c (S132).

For example, after the touch is continued from a state of above mentioned FIG. 12(a), when the targeted page number p is being set to 80, the finger can be released. In this case (S105: NO), the CPU 100 displays the thumbnail P80 of the page 80, which is the targeted page, on the display surface 11c, as shown in FIG. 12(b), in the processing of the step S132.

In FIG. 12(b), the thumbnail P80 is displayed on the left side of the targeted page number display column C1. However, the position where the thumbnail P80 is displayed does not need to be the left side of the targeted page number display column C1 as long as the user can see the thumbnail P80. For instance, the position where the thumbnail P80 is displayed can be an upper or a right side, etc., of the targeted page number display column C1, button B1 or B2.

Returning to FIG. 11, in the step S133, the CPU 100 determines whether the OK button B1 is pressed down (touching the image of the button) or not. If the OK button B1 is pressed down (S133: YES), the CPU 100 displays the page p on the display surface 11c (S107).

If the OK button B1 is not pressed down (S133: NO), the CPU 100 determines next whether the CANCEL button B2 is pressed down or not (S134). If the CANCEL button B2 is pressed down (S134: YES), the CPU 100 displays again the current page on the display surface 11c since the display of the targeted page is canceled (S135).

As shown in FIG. 12(b), while the thumbnail P80 of the page 80 is in the state of being displayed on the display surface 11c, the OK button can be pressed down as shown in FIG. 12(c). In this case, as in FIG. 9(c), the page 80 is displayed on the display surface 11c.

Also, as shown in FIG. 12(b), while the thumbnail P80 of the page 80 is in the state of being displayed on the display surface 11c, there is a chance that the CANCEL button is pressed down. In this case, page 64 (the current page) is displayed on the display surface 11c.

When the processing of the step S107 or S135 is terminated, the page turning processing according to the present modification example is terminated.

According to the configuration of the present modification example, after the finger is released from the display surface 11c, if the OK button B1 is pressed down, the pages is turned. That is, the targeted page currently being set is displayed. Also, if the CANCEL button B2 is pressed down, the pages is not turned. That is, the current page is again displayed on the display surface 11c. Thus, the user him/her self can choose whether the page of the targeted page number being set would be displayed or not, and it is more convenient.

Further, in the present modification example, while the update of the targeted page number p is stopped based on the fact that the finger is released from the display surface 11c, the thumbnail of the currently set targeted page is displayed on the display surface 11c. The user can learn about the summary of the targeted page by looking at the displayed thumbnail of the targeted page. Thus, the user can select whether to allow or chancel the display of the targeted page by reference to the summary of the targeted page, and it is further convenient.

Modification Example 4

In the above modification example 2, it is updated for the targeted page number increases or decreases according to the touch on the display surface 11c. In contrast, in the modification example 4, the update of the targeted page number is stopped temporarily according to the touched position of the touch by the user. Also, the updating direction and rate of the targeted page number (see later explained variable "updating degree" d2) are changed suitably according to the touched position of the touch by the user.

FIG. 13 is a flow chart for explaining the procedure for processing of the page turning processing according to the present modification example. The flowchart of FIG. 13 is the flow chart which replaces a processing of a step S121 of the flow chart shown in FIG. 8 with the processing of a step S141, adds a processing of a step S142 between the steps S103 and S104 and replaces processings of steps S122-S123 with processings of steps S142-S143.

FIGS. 14(a) to 14(c) and FIGS. 15(a) to 15(c) are diagrams for explaining the display screen when the page turning processing shown in FIG. 13 is executed.

After the initial touched position is detected (S111), in the step 141, the CPU 100 sets the updating degree d2, which is a variable, for 0. As described later, every time the predetermined updating cycle passes, the updating degree d2 is set according to the initial touched position and the current touched position (see S143). Further, the targeted page number p is updated to be p+d2 (see S123). Therefore, while d2 is set to 0, the targeted page number p is not changed.

In a step S142, the CPU 100 displays a scale S on the display surface 11c. As shown in FIG. 14(a), the scale S is displayed between the touched position and the targeted page number display column C1.

The scale S extends in the X axis direction. The scale S includes scale marks at almost equal distances with an image of numbers 4, 3, 2, 1, 0, −1, −2, −3, −4 displayed over each scale mark. The CPU 100 displays the scale S on the display surface 11c so as to almost match the initial touched position and the X axis coordinate of the scale mark corresponding to the number 0.

The scale S is for notifying the user the relationship between the touched position and the updating degree d2 (see S143 below).

After the processing of the step S112 is finished, the processing of the step S143 is executed. The CPU 100 sets the number corresponding to the scale mark nearest to the current touched position for the updating degree d2 (S143). Then, the CPU 100 updates the targeted page number from p to p+d2 and sets (S144).

For example, as shown in FIG. 14(a), when the finger is pointing at the scale mark 0, the scale mark nearest to the touched position corresponds to the number 0. In this case, in the step S143, the updating degree d2 is set to 0.

Also, for instance, after the sliding operation is performed in the direction shown by the arrow of FIG. 14(a), the touched position can be pointed to the scale mark 4. In this case, in the step S143, the updating degree d2 is set to 4. Accordingly, in the step S144, the targeted page number p is added with 4, and is set to be p+4.

As in the above, when the touch is continued so as the touched position to point out the scale mark 4, the CPU 100 increases the targeted page number p by 4 each. By being increased the targeted page number p at the rate corresponding to the scale mark 4, the targeted page number p is, for example, set to be 192 as shown in FIG. 14(b). The user releases the finger at this point from the display surface 11c, as in FIG. 14(c), the page 192 is displayed.

Also, as explained below, the updating degree d2 may be set to a negative value based on the position touched.

As in FIG. 14(b), when the targeted page number p is set to be 192, and the touched position indicates the scale mark 4, the touched position can be moved in a right direction. For instance, as shown by the arrow facing right direction of FIG. 15(a), there would be a time the user slides his/her finger to indicate the scale mark −2. In this case, the updating degree d2 is set to be −2 (S143), and the targeted page number p is updated to reduce 2 pages at each time (S144).

When the touch is continued so as the touched position to indicate the scale mark −2, by being reduced the targeted page number p by 2 at a time, the targeted page number p is reduced at the rate corresponding to the scale mark −2, and for example, as shown in FIG. 15(b), the targeted page number p is set to be 182. At this time, if the user releases the finger, as shown in FIG. 15(c), the page 182 is displayed.

When a sliding is performed for the touched position to indicate the scale mark 0, the updating degree d2 is set to be 0 in the step S143. In this case, the targeted page number p is not updated by executing a processing of a step S144. That is, while the touch is performed so as the touched position indicates the scale mark 0, the targeted page number p is not changed.

As such, while the user keeps touching, the user can change the updating degree d2 at any timing regardless of the value the updating degree d2 takes, that is, positive, negative or 0.

According to the configuration of the present modification example, while the display surface 11c is touched, the updating degree d2 of the targeted page number p is changed according to the initial touched position and the current touched position. The user can stop updating the targeted page number p by performing a touch in such a manner that the touched position indicates the scale mark 0 of the scale S.

Further, the user can increase the range of increase of the targeted page number p by moving the current touched position to the left side compared with the initial touched position. That is, the updating rate of the targeted page number p (d2/T0) is accelerated. On the other hand, the user can reverse the updating direction (sign of d2) of the targeted page number p by moving the current touched position to the right side compared to the initial touched position. That is, the targeted page number p can be decreased. The user can perform the page turning operation comfortably while changing the updating direction and the updating rate of the targeted page number at desired timing.

Modification Example 5

In the above embodiment, as the targeted page number p is updated, the set targeted page number p is displayed on the display surface 11c. In the modification example 5, in addition to the targeted page number p, a tagged list including thumbnails of pages with tag is displayed on the display surface 11c. As explained below, when one of the thumbnails on the tagged list is selected by the user, a page corresponding to the selected thumbnail is displayed on the display surface 11c.

Here, the "tag" is a mark applied to the desired position of an electronic document prepared by the user such as a memo, a bookmark, a highlighted text, etc.

Usually, the pages with the tag are considered very important for the user among the all pages of the electronic book. Thus, the operation to display the tagged pages can be easily done by a user is desirable.

FIG. 16 is a flow chart for explaining the procedure for processing of the page turning according to the present modification example. The flow chart of FIG. 16 is the flow chart which is added a processing of a step S151 between steps of S103 and S104 of the flow chart shown in FIG. 4, added a processing of a step S152 between steps S109 and S110, and replaced a processing of a step S107 with processings of steps S153-S160.

FIGS. 17(a) and 17(b) and FIGS. 18(a) to 18(c) are diagrams for explaining the display screen when the page turning processing shown in FIG. 16 is executed.

As in FIG. 3, in a state where the page 64 is displayed, when the display surface 11c is touched (S101: YES), the CPU 100 executes the processing of the step S151 after the processings of the steps S102 and S103. In the step S151, the CPU 100 displays the tagged list L1, OK button B1 and CANCEL button B2 on the display surface 11c as shown in FIG. 17(a).

The tagged list L1 is what the thumbnails of pages whose page numbers being closer to the targeted page number p among the pages with the tag are arranged lengthwise (Y axis direction). The CPU 100 places the thumbnail of the page which has the closest page number to the targeted page number p on almost the center of the tagged list L1 displayed on the display surface 11c.

In FIG. 17(a), the tagged list L1 includes the thumbnails P55, P67, P75 and P82 of the pages 55, 67, 75 and 82. These thumbnails P55, P67, P75 and P82 are arranged in ascending order of the page numbers from the top. The thumbnail of page 67 which has the closest page number to the targeted page number p (=65) is arranged on almost the center of the tagged list L1.

In the step S152, the CPU 100 updates the tagged list where the thumbnails of tagged pages with page numbers close to the targeted page number p are arranged lengthwise and displays the tagged list on the display surface 11c as the same with the processing of the step S151.

While the processings of the steps S108-S110 and S152 are executed repeatedly, the thumbnail of the tagged page with the closest page number to the targeted page number p is arranged on almost the center of the tagged list L1 according to the update of the targeted page number p.

For example, as shown in FIG. 17(b), when the targeted page number p is set to 80, the user's finger can be released from the display surface 11c. In this case, after that, if the OK button B1 is pressed down, page 80 which is the targeted page is displayed on the display surface 11c. On the other hand, if the CANCEL button B2 is pressed down, the current page (page 64) is displayed on the display surface 11c.

In FIG. 17(b), the tagged list L1 includes the thumbnails P67, P75, P82, P98 and P102 of pages 67, 75, 82, 98 and 102. The thumbnail P82 which has the closest page number 82 to the current targeted page number p (=80) is displayed on almost the center of the tagged list L1.

When the CPU 100 determines that the CANCEL button B2 is not pressed down in the step S155 (S155: NO), the CPU 100 determines whether any of the thumbnails on the tagged list L1 is tapped or not (S157). When any of the thumbnails on the tagged list L1 is tapped (S157: YES), the CPU 100 displays a page corresponding to the tapped thumbnail on the display surface 11c. For example, as shown in FIG. 17(b), in a state where the tagged list L1 is displayed on the display surface 11c, it can happen that the thumbnail P82 be tapped. In this case, the CPU 100 displays page 82 on the display surface 11c.

When it is determined that none of the thumbnails on the tagged list L1 is tapped (S157: NO), the CPU 100 determines whether a sliding in a vertical direction is performed or not on the tagged list L1 (S159). When the sliding is performed in the vertical direction on the tagged list L1 (S159: YES), the CPU 100 scrolls the tagged list L1 in the direction the sliding is performed. when the sliding is not performed in the vertical direction on the tagged list L1 (S159: NO), the CPU 100 returns to the processing of S153.

For instance, as shown in an arrow of FIG. 18(a), when a sliding is performed in an upper direction (S159: YES), the CPU 100 scrolls the tagged list L1 in the upper direction (S160). Since the tagged list L1 is scrolled, for example, as in FIG. 18(b), thumbnails P123 and P130 of tagged pages 123 and 130 which have not been displayed until now are displayed below the thumbnail P102.

As in FIG. 18(b), when the thumbnail P123 is tapped (S157: YES), the CPU 100 displays page 123 corresponding to the tapped thumbnail P123 on the display surface 11c as shown in FIG. 18(c).

When the processings of the steps S154, S156 and S158 are finished, the processing of turning pages explained in the flow chart of FIG. 16 is terminated.

According to the configuration of the present modification example, while the targeted page number p is updated, the user can see the thumbnails of the tagged pages, near the targeted page, within the predetermined page range from the targeted page. Also, by tapping the thumbnail, the page corresponding to the thumbnail can be displayed on the display surface 11c.

Further, according to the configuration of the present modification example, the user does not need to perform any special operation individually to display the thumbnail display of the tagged page in the middle of updating the targeted page number p.

Also, the user can browse the thumbnails of the tagged pages by sliding the tagged list L1 in the vertical direction.

The user can scroll the tagged list L1 while figuring out the summary of the tagged pages by looking at the thumbnails.

Thus, according to the configuration of the present modification example, the tagged pages which are expected to be the most important pages for the user can be displayed by a simple operation with one finger.

Modification Example 6

In the above embodiment, while the display surface 11c is touched, the targeted page number which is the page number of the page to be displayed on the display surface 11c is updated. In contrast, in the modification example 6, the page number of the page to be displayed on the display surface 11c is determined based on a selection input performed after the touch, in concrete, based on a direction of a flicking.

In concrete, while the display surface 11c is touched, a range of the increase and decrease of the page number (see "updating range" described later) is updated. In other words, not one, but two targeted page numbers (see "first and second targeted page numbers" later explained) are updated. The first and the second targeted page numbers are what the updating range is added to and subtracted from the current page number, respectively (see S164). As described below, when the flicking is performed in the left direction, a page of the first targeted page number (hereinafter, referred to as "the first targeted page") is set to be the page number displayed on the display surface 11c. Also, when the flicking is performed in the right direction, a page of the second targeted page number (hereinafter, referred to as "the second targeted page") is set to be the page number displayed on the display surface 11c.

FIG. 19 is a flow chart for explaining the procedure for the page turning processing of according to the present modification example. The flow chart of FIG. 19 is the flow chart which is displaced processings of the steps S102 and S103 of the flow chart shown in FIG. 4 with processings of the steps S161 and S162, displaced processings of the steps S108 and S109 with processings of steps S163 and S164, and displaced a processing of step S107 with processings of the steps S165-S169.

FIGS. 20(a) to 20(c) and FIGS. 21(a) to 21(c) are diagrams for explaining the display screen when the page turning processing is executed according to the present modification example.

In a step S161, the CPU 100 assigns an initial value 1 to the updating range c which is a variable. Then, the CPU 100 assigns an initial value p0+c(=p0+1) to the first targeted page number p1, and assigns an initial value p0−c(=p0−1) to the second targeted page number p2. Here, the PO is the current page number.

For example, as in FIG. 3, when the display surface 11c is touched while page 64 is displayed, 1 is set to the updating range c. Then, 65(=64+1) is set to the first targeted page number p1, and 63(=64−1) is set to the second targeted page number p2.

In the step S162, the CPU 100 performs a processing of an initial display such as the displays of the updating range c, first and second target page numbers p1 and p2, etc. As shown in FIG. 20(a), in the targeted page number display column C2 provided on the upper part of the touched position, the first targeted page number p1, the updating range c and the second targeted page number p2 are displayed from the left.

Also, in the step S162, the CPU 100 displays an arrow A1 facing left side on the left side of the touched position, and displays an arrow A2 facing right side on the right side of the touched position. As in FIG. 20(a), over the arrow A1, a character string of "forward" is displayed, and over the arrow A2, a character string of "backward" is displayed.

The arrow A1 is the arrow to notify the user that the currently set first targeted page (page p1) is displayed on the display surface 11c when a flicking to the left is performed. The arrow A2 is the arrow to notify the user that the currently set second targeted page (page p2) is displayed on the display surface 11c when a flicking to the right is performed.

In a step S163, the CPU 100 executes a processing of updating the updating range c, the first and the second targeted page numbers p1 and p2. The CPU 100 increases the updating range c for 1. Then, the CPU 100 sets p0+c to the first targeted page number p1. The CPU 100 sets p0−c to the second targeted page number p2. That is, the first targeted page number p1 is set to increase 1, and the second targeted page number p2 is set to decrease 1.

In a step S164, the CPU 100 displays the updating range c and the first and the second targeted page numbers p1 and p2 which are updated on the targeted page number display column C2.

As in FIG. 20(a), after the processing of the initial display processing (S162) is executed, if the touch on the display surface 11c is continued (S105: YES), the processings of the steps S163 and S163 are executed repeatedly with updating cycle T0. For example, the updating range c is set to 16. Accordingly, the first targeted page number p1 and the second targeted page number p2 can be set to 80 (=64+16) and 48(64−16), respectively. In this case, the updating range c, the first targeted page number p1 and the second targeted page numbers p2 after the setting is done are displayed on the targeted page number display column C2 as shown in FIG. 20(b).

Further at this time, when the release of the finger is detected (S105: NO), the processing of the step S165 is executed. That is, as in FIG. 20(b), when the updating range c is 16, as in FIG. 20(b), if the finger is released from the display surface 11c, the processing of the step S165 is executed.

In the step S165, the CPU 100 determines whether a flicking in the right direction or the left direction is performed or not within the predetermined time (S165). The predetermined period of time is, for example, for a few 100 milliseconds-a few seconds. When the flicking in the right direction or left direction is not performed, the CPU 100 displays again the current page (page p0) on the display surface 11c considering that the operation for the page turning is canceled by the user (S165).

When the flicking in the right direction or left direction is performed within the predetermined period of time (S165: YES), the CPU 100 proceeds to a processing of a step S167.

In the step S167, the CPU 100 determines in which direction of the right side or the left side the flicking detected by the step S165 is performed. When the flicking is performed in the left direction (S167: left), the CPU 100 displays the first targeted page, that is, the page p1 on the display surface 11c. When the flicking is performed in the right direction (S167: right), the CPU 100 displays the second targeted page, that is, the page p2 on the display surface 11c.

As shown in FIG. 20(b), in the state where the first targeted page number p1 is set to 80, and the second targeted page number p2 is set to 48, respectively, a flicking can be performed in the direction of the arrow A1 facing left side as shown in FIG. 20(c). In this case, as shown in FIG. 21(a), page 80 is displayed on the display surface 11c. On the other hand, when the flicking is performed in a direction of the arrow A2 facing right side as shown in FIG. 21(b), page 48 is displayed on the display surface 11c as shown in FIG. 21(c).

When the processings of the steps S166, S168 and S169 are terminated, the page turning processing is terminated according to the present modification example.

According to the configuration of the present modification example, it is determined that a selection input to advances or returns the pages with respect to the display surface 11c is performed. According to the result of the determination, the page which is advanced or returned by the amount of updating range c (amount to be turned) from the page currently displayed is displayed on the display surface 11c. In concrete, when a touch is performed with respect to the display surface 11c, the updating range c, the first and the second targeted page numbers p1 and p2 are updated. The user can designate by flicking direction performed after the touch whether to advance to the page p1 or returns to the page p2 on the display surface 11c.

Also, while the touch to the display surface 11c is continued, the updating range c and the first and the second targeted page numbers p1 and p2 which are updated are displayed on the targeted page number display column C2. For this reason, the user can easily see the number of pages to skip (updating range c) and the page numbers of the pages to be displayed after the operation (the first and the second targeted page numbers p1 and p2) even before the designating action of flicking is performed, and it is convenient.

Thus, also in the configuration of the present modification example, the user can perform the page turning operation comfortably.

Modification Example 7

In the modification example 6, based on the direction of the flicking performed after the release of the touch with respect to the display surface 11c, either one of the first and the second targeted pages is selected, and the selected page is displayed. In contrast, in the modification example 7, a decision of selecting which of the first or second targeted page, that is, the direction of the page turning (forward or backward) is made based on the flicking direction from the touching state, not based on the flicking after the release. Here, "flicking from the touching state" means performing the operation of flicking from a state where the finger is still touching the display surface 11c. Determination of whether the flicking is performed from the touching state or not is made based on whether the sliding speed (pixel/second) at a period of time of a predetermined length right before the touch is released exceeds the predetermined threshold (for example, a few 10 pixels/a few 10 millisecond) or not.

FIG. 22 is a flow chart for explaining the procedure for the page turning processing according to the present modification example. The flow chart of FIG. 22 is a flow chart that processings of steps S105 and S165 of the flow chart shown in FIG. 19 is replaced with processings of steps S171 and S172.

The processing of a step S171 is executed after the processings of steps S104 and S109 are terminated. In the step S171, the CPU 100 determines whether a flicking from a state of a touch in the right direction or the left direction is performed or not.

When the flicking from the state of the touch in the right direction or the left direction is not performed (S171: NO), the CPU 100 determines whether the touch to the display surface 11c is currently performed or not (S172). When the touch is performed (S172: YES), the processing moves to the step S106. When the touch is not performed (S172: NO), the processing moves to the step S166.

When the flicking from the state of the touch in the right direction or the left direction is performed (S171: YES), as the same with the processings of steps S167-S169 of FIG. 19, the first or the second targeted page is displayed on the display surface 11c. That is, when the flicking from the state of the touch in the left direction is performed (S167: left), the page p1 which is the first targeted page is displayed on the display surface 11c (S168). When the flicking from the state of the touch in the right direction is performed (S167: right), the page p2 which is the second targeted page is displayed on the display surface 11c (S169).

The touch performed on the display surface 11c is continued as shown in FIG. 20(a), and after that, the flicking from the touching state can be performed. For example, when the first and the second targeted page numbers p1 and p2 are 80 and 48, respectively, as shown in FIG. 20(c), without releasing the touching finger, in the left direction (the direction of the arrow A1), the flicking from the touching state can be performed. In this case, as shown in FIG. 21(a), page 80 which is set to be the first targeted page is displayed on the display surface 11c.

As the same, when the first and the second targeted page numbers p1 and p2 are 80 and 48, respectively, as shown in FIG. 21(b), without releasing the touching finger, in the right direction (the direction of the arrow A2), the flicking from the touching state can be performed. In this case, as shown in FIG. 21(c), page 48 which is set to be the second targeted page is displayed on the display surface 11c.

Incidentally, the user can turn or turn back a page by performing a flicking from the state where the finger is off the display surface 11c, not a flicking from the touching state as the above. Regarding this processing, it is explained below.

For instance, in a state where page 64 being displayed as in FIG. 3, when the flicking in the left direction with respect to the display surface 11c is performed (S101: YES), in the step S161, 65 is set for the first targeted page number, and 63 is set for the second targeted page number. When the duration of the touch by the flicking is shorter than the updating cycle T0, the processing of the step S163 is not executed at all, but released. In this case, in a state of the first targeted page number being 65, it is determined to be YES at the step S171. In the next step S167, it is determined that the flicking is performed from the touching state in the left direction (S167: left), and page p1 is displayed on the display surface 11c (S168).

That is, when the flicking in the left direction is performed, the next page of the electronic document is displayed on the display surface 11c. As the same, when the flicking in the right direction is performed, a page before the current page is displayed on the display surface 11c.

According to the present modification example, it is determined that the selection input is performed to advance or returns the pages with respect to the display surface 11c, and according to the result of this determination, the pages advanced or retuned by the updating range c (amount to be turned) from the current page number corresponding to the currently displayed page is displayed on the display surface 11c. In concrete, when a touch is performed to the display surface 11c, updating range c and the first and the second targeted page numbers p1 and p2 are updated. The user can easily perform to designate whether to turn the page to the page p1 or to turn back the page to the page p2 with an operation with one finger by determining the direction of the flicking from the touching state.

Also, when the user wants to continue reading the next page, the user can just flick the display surface 11c in the left direction. When the user wants to go back to a page before, the user can flick the display surface 11c in the right direction. That is, the user does not need to draw a major distinction between a touching operation to turn a plurality of pages and a touching operation to turn a page.

Thus, also in the configuration of the present modification example, the user can perform the page turning operation comfortably.

Modification Example 8

In the above embodiment, the updating cycle T0, the updating direction d1 and updating degree d2 are changed according to the movement of the touched positions. In the modification example 8, instead of the X coordinate (pixel) of the initial and current touched positions, the updating T0 is set based on an initial contact dimensions and a current contact dimensions (pixel^2).

FIG. 23(a) is a flow chart for explaining the procedure for processing according to a modification example 8 and 23(b) is a diagram showing a screen display example when the page turning processing is executed according to the modification example 8.

The flow chart of FIG. 23(a) is what the processings of the steps S111-S113 of the flow chart of FIG. 6 are replaced with the processings of steps S181-S183. In the steps S181 and S182, the initial contact dimensions of touch and the current contact dimensions of touch are detected. In the step S183, as below, based on the initial contact dimensions of touch and the current contact dimensions of touch, the updating cycle T0 is set.

FIG. 23(b) is a diagram for explaining schematically the contact dimensions that is detected while the display surface 11c is touched by a finger. Each of areas R1, R2 and R3 which is framed by a solid line indicates the areas where the finger has contacts when the finger touches the display surface 11c. The updating cycle T0 is set to be small when the initial contact dimensions is the area R1, and the current contact dimensions is the area R2 which is bigger than the area R1. Also, when the current contact dimensions is the area R3 which is smaller than the area R1, the updating cycle T0 is set to be big. That is, the updating cycle T0 is set based on a ratio or a difference between the initial and current touched positions.

Also with the configuration of the present modification example, the user can change the updating rate (1/T0) with a simple operation by one finger and display a desired page in shorter period of time.

Similarly, the updating direction d1 and the updating degree d2 can be configured to be set according to the initial contact dimensions and the current contact dimensions. For instance, when the contact dimensions increases from the area R1 to the area R2, the pages are turned to increase. When the contact dimensions decreases from the area R1 to the area R3, the pages are turned to decrease.

<Others>

In the above embodiment, when the touched position is not changed, the updating cycle T0 is not changed. However, the updating cycle T0 may be changed based on other various parameters. For example, in the step S101, after the touch is detected, as the time passes, the updating cycle T0 can be set to decrease compared to the initial value. By being set the updating cycle T0 like the above, the updating rate of the targeted page number is gradually accelerated, and the time needed for an operation to turn a lot of pages forward or backward at one time can be shortened. The acceleration of the updating rate can be increased at the same rate uniformly according to the elapsed time since the touch is detected. Also, the updating cycle T0 may be set variously, for example, that the updating cycle T0 increases in a staircase pattern according to the elapsed time since the touch is detected.

Also, after the touch is detected in the step S101, for the first couple of seconds, the updating cycle may be set to be big. For setting the updating cycle big, when only one page is needed to be turned, an incorrect operation that a plurality of pages being turned by mistake may decrease.

In the modification example 1, even if anywhere of the display surface 11c is touched (S101: YES), the processing after S111 is executed. However, in this configuration, for example, if the first touch is performed to the area close to the left edge of the display surface 11c, even if the current touched position is moved to the left edge of the display surface 11c, the change of the touched positions would not exceed the threshold value, and therefore, an inconvenience that the updating cycle cannot be changed may occur. To avoid such inconvenience, the modification example 1 may be modified to execute the processing of FIG. 6 when the center part of the horizontal direction on the display surface 11c is touched. This modification can be applied to other modification example as well. For example, in modification example 4, it may be modified to execute the processing after S111 of FIG. 13 when a range that can display everything of the scale S on the display surface 11c for certain (see FIG. 14(a)) is touched.

For instance, it can be set to T0=initial value*C^(X1−X0). Here, C is predetermined positive value, and a symbol "^" means a power. Since the updating cycle T0 is set as such, the user can set the updating rate extensively. Also, the updating cycle T0 may be set variously like being changed in a staircase pattern according to a change of the touched positions.

In the modification example 4, the updating degree d2 is changed in almost proportion to the change of the touched position. However, the updating degree d2 does not need to be proportional to the change of the touched position in almost linear shape. For example, the updating degree d2 may be set to change in an exponential manner according to the changing amount of the touched position (X1−X0). Also, the updating degree d2 may be set variously like being changed in a staircase pattern according to a change of the touched positions.

In the modification example 3, the thumbnails of the targeted pages are displayed on the display surface 11c when the OK button B1 and CANCEL button B2 are not pressed down (see FIG. 12). Not limited to this, for example, in the modification example 4 shown in FIG. 13, while the updating degree d2 is set to 0, that is, when the page turning processing is executed so the targeted page number p is not changed, the thumbnails of the targeted pages may be displayed on the display surface 11c. In this case, the thumbnail of the targeted page is displayed on the display surface 11c as shown in FIG. 24(a). While updating of the targeted page number p is stopped, by displaying the thumbnail, the user can learn the summary of the page p which is the targeted page while executing the page turning processing.

Also, not only when the updating of the targeted page number p is stopped, but also when the updating rate of the targeted page number p is slow, the thumbnail of the current targeted page may be displayed on the display surface 11c. For example, when the updating cycle T0 is big, or when the updating degree d2 is small, the thumbnail of the current targeted page may be displayed on the display surface 11c. In this example, the user can learn summary of the targeted page while executing the page turning processing. Or, even when the updating rate of the targeted page number is not slow, the thumbnail of the current targeted page may be displayed on the display surface 11c.

In the modification example 5, the tagged list L1 is displayed on the display surface 11c while the targeted page number p is updated. However, the tagged list L1 does not need to be displayed on the display surface 11c while the targeted page number p is updated. For example, instead of the tagged list's being displayed, as shown in FIG. 24(b), a button B3 for displaying the tagged list can be displayed on the display surface 11c. On the button B3, a string of characters "tagged list" is displayed. In this case, the user can display the tagged list L1 on the display surface 11c as in FIG. 24(c) by pressing down the button B3. Also, as in FIG. 24(c), when the tagged list L1 is displayed, a button for releasing the display of the tagged list may be displayed on the display surface 11c.

In the modification 3, when the touch for setting the targeted page number is released (S105: NO), the targeted page number p cannot be increased again. However, it is fine to make the targeted page number p to be able to increase the number again. For example, as in FIG. 12(b), while in the state where the finger is released, and an area of a background image (the image of page 64) of the display surface 11c is touched, it is fine to restart updating the targeted page number p. In this case, while another touch is continued, the current targeted page number p increases further from 80. In the modification example 5, similar modification can be employed.

In modification examples 1, 2 and 4, the updating cycle T0, the updating direction d1 and the updating degree d2 are changed according to the movement of horizontal direction (X axis direction) of the touched positions, respectively. However, the updating cycle T0, updating direction d1 and updating degree d2 are not necessary to be updated according to only the movement of the horizontal direction of the touched positions, for example, it may be constructed to be changed according to the movement in a vertical direction (Y axis direction) and in an oblique direction of the touched positions.

For example, the updating degree d2, explained in the modification example 4, and in FIG. 25(a), can be constructed to be changed according to the movement in the vertical direction (seethe arrow) of the touched position. In this case, on the display surface 11c, a scale SV which extends in the vertical direction is displayed. Then, the updating degree d2 is set to the number of a scale mark that the touched position indicates based on the movement of the touched position in the direction of the arrows facing up and down from the initial touched position (see S143 of FIG. 13).

In addition, the updating cycle T0, the updating direction d1 and the updating degree d2 do not need to be changed according to only linearly movement. For example, the updating cycle T0, the updating direction d1 and the updating degree d2 may be constructed to change according to the movement of the touched position along an arc on the display surface 11c.

In the modification example 4, the scale S is displayed on the display surface 11c. Not only in the modification example 4 but also in other modification examples, a relationship between parameters such as the updating cycle T0, the updating direction d1, the updating degree d2, the updating rate, etc., that show the state of updating the targeted page number and the touched positions is notified to the user, an image of a scale may be displayed on the display surface 11c.

For example, the construction of the modification example 1 can be changed so as to display the scale for notifying the user the relationship between the updating cycle T0 (the modification example 1) and the touched position on the display surface 11c. Further, a configuration that the updating cycle T0 is updated according to the movement of the touched position in a vertical direction (Y axis direction) may be taken. In this case, the scale which extends in the vertical direction is displayed on the display surface 11c by almost centering the initial touched position. For example, on the scale mark, in order of the positive or negative in direction, the numbers 0.25, 0.5, 0.75, 1, 1.25, 1.5, 1.075 indicating a ratio (to be precise, the ratio of the current updating rate against the initial updating rate) of the updating rate (1/T0) are displayed. The user can, for example, update the targeted page number p with half the rate of the initial updating rate by sliding the finger so the touched position points at the scale mark 0.5.

The scale can face any direction, can have any curvature, can be displayed anywhere on the display surface 11c, and can have any shape according to the movement of the detected touched position. Further, an image displayed does not need to be a scale. As long as the image is for notifying the user the relationship between updating state of the targeted page number and the touched position, any images, such as a stick shaped image, a circular graph, or an animation, etc., may be displayed.

Configurations of each modification example can be combined to each other with a plurality of combinations. For example, as shown in FIG. 25(b), based on the movement of a vertical direction of the touched position (see arrows facing up and facing down), as explained in modification example 1, the updating cycle T0 is changed, and based on the flicking from the touching state in the horizontal directions (see arrows A1 and A2), as in the modification example 7, the determination to turn the page forward or backward may be made.

Also, as another example, the modification example 1 and 2 can be combined to each other. That is, the updating cycle T0 and the updating direction d1 can be changed based on the movement of the touched position. For instance, according to the positional relationship of vertical direction (Y axis direction) of the current touched position and the initial touched position, d1 is changed to positive or negative, and according to the distance of the vertical direction of the current touched position and the initial touched position, the updating cycle T0 may be changed to be small. In this case, the user can, as the same with the case in FIG. 25(a), update the targeted page number p in a direction of decreasing or increasing, by making it faster by the amount the touched position is moved in an up or down direction from the initial touched position. Also in this example, an image of a scale, etc., extending in the vertical direction for notifying the relationship between a parameter to set an updating state of the targeted page number and a touched position can be further displayed.

In the modification example 5, when a thumbnail displayed on a tagged list L1 is tapped, a page corresponding to the thumbnail is displayed on the display surface 11c. A method the user selects a thumbnail does not need to be limited to a tapping. For instance, it may be configured that in a state where the tagged list L1 is displayed as in FIG. 25(c), when a flicking (see the arrow) from a touched state is done to upper direction (Y axis positive direction), the page 82 which is the closest to the currently set targeted page number p (=80) and which is the page with a tag is displayed on the display surface 11c.

In the modification example 5, the tagged list created by the user is displayed on the display surface 11c. However, the tag attached to the electronic documents does not need to be limited to the one the user of the cellular phone 1 applied. For instance, the tag can be made based on data obtained through the communication module 303, such as the tag can be the tag that other user make, etc.

In the modification example 5, while updating the targeted page number, the tagged list is displayed on the display surface 11c. However, it can be configured to display not only the tagged list but also the list of thumbnails of pages selected based on a predetermined condition on the display surface 11c. For example, it can be configured to display the list of thumbnails being arranged including the pages with the title of each chapter on the display surface 11c while the target page number is updated. When the thumbnails of pages including the title of each chapter are displayed, for the pages including the titles for each chapter and verse to be easily detected, the electronic documents are desirable to be tagged or structured electronic documents. When an electronic document which is not a tagged or structured electronic document is read, the CPU 100 considers, for example, a page including letters with big fonts as the page including the title of the chapter and verse, and can display a list of the thumbnails of these pages. For instance, being a page with a tag, a page including the title of the chapter and verse, a page including predetermined search keywords, a page including images, etc., are considered to be predetermined conditions above. The thumbnails displayed on the display surface 11c can be generated at the time of the execution of the page turning processing, previously generated, or obtained through the communication module 303.

In the modification example 1, 2 and 4, each of the updating cycle T0, the updating direction d1 and the updating degree d2 is set based on the initial touched position and the current touched position. However, these parameters do not always need to be set by depending on the initial touched position.

For example, the step S113 of FIG. 6 can be modified to be the step S191 of FIG. 26. In this case, the updating rate of the targeted page number p is set based on the previous and the current touched positions. In the step S191, the updating cycle T0 is changed based on the difference between the X coordinate X1 of the current touched position and the X coordinate X1' of the previous touched position. Here, the "previous touched position" means the touched position detected when the step S112 has executed previous time.

In the step S191, the updating cycle T0 can be set to a multiplication by 2^n (2 to the n power. n is integer) of an initial value of the updating cycle. As exemplified in FIG. 27(a), when the current touched position (see the figure of a finger in solid line) locates on the left (see the arrow) for more than predetermined width D (pixel) compared to the previous touched position (see the figure of a finger in dashed line), that is, when X1≤X1'−D, the updating cycle T0 is changed to ½ times of the current updating cycle T0. For example, when the updating cycle T0 before the change is Ts, the updating cycle T0 after the change is Ts/2. In this case, the updating rate of the targeted page number p is twice as fast, and the targeted page number p is, for example, rapidly increased from 80 to 194 (see FIG. 27(b)).

Also, when X1≥X1'+D, the updating cycle T0 is set to be double of the current updating cycle T0. For example, as in FIG. 27(b), when the touched position is moved from the state of FIG. 27(a) in the right direction (see the arrow) for more than the width D, the updating cycle T0 is changed to the double (Ts) of the current updating cycle T0 (Ts/2). In this case, the updating rate of the targeted page number p becomes ½ times of a case of FIG. 27(a). After that, if the touched position is not changed but the touch is continued, for example, as in FIG. 27(c), the targeted page number p is increased from 194 to 196. At this time, when the finger is released, based on the amount to be turned, the targeted page, that is, the page 196 is displayed on the display surface 11c.

Also, for example, as in the flow chart of FIG. 28, the updating direction d1 of the targeted page number p may be set based on the previous and the current touched positions. In FIG. 28, the processing of the step S122 of FIG. 8 (the flow chart of the modification example 2) can be replaced with the processing of the step S192. In the step S192, the updating direction d1 is changed based on the difference between the X coordinate X1 of the current touched position and the X coordinate X1' of the previous touched position.

In the step S192, the updating direction is set to 1 or −1. As exemplified in FIG. 29(a), when the current touched position (see the figure of a finger in solid line) locates on the right (see the arrow) for more than predetermined width D (pixel) compared to the previous touched position (see the figure of a finger in dashed line), that is, when X1≥X1'+D, the updating direction d1 is set to −1. For example, the targeted page number p is reduced from 80 to 60 (see FIG. 29(b)) in the predetermined rate (1/T0).

In a case of X1≤X1'+D, the updating direction d1 is set to be 1. As in FIG. 29(b), when the targeted page number p is set to 60, and when the touched position is moved in a left direction (see arrow) for more than the width D, the updating direction d1 is set to be 1. In this case, the targeted page number p is increased with a predetermined rate (1/T0). After that, if the touch is continued without changing the position, for example, as in FIG. 29(c), the targeted page number is set to 68. After the touch is continued, and the finger is released, the targeted page number, that is, page 68 is displayed on the display surface 11c.

In the above embodiment and modification examples, according to the continuation of the touch to the display surface 11c, the targeted page number p displayed on the targeted page number display column C1 is updated. Here, the targeted page number p is what the amount of pages to be turned is added to the page number p0 of the currently displayed page. However, not limited to this, the amount of pages to be turned, that is, the number of pages to be turned (p−p0) may be displayed on the display surface 11c. In this case, it is configured to update the amount of the pages to be turned according to the continuation of the touch to the display surface 11c.

For instance, in the modification example 2, as in FIG. 9(b), instead of the number "80" that is the targeted page number p is displayed, it can be modified to display the number "+16" which is the amount to be turned in the turning amount display column C3 as in FIG. 30(a). In this case, if the amount to be turned is negative, for example, −4, as in FIG. 30(b), "−4" is displayed on the turning amount display column C3. When the finger is released at this moment, page 60 (=64−4) is displayed on the display surface.

Also, the amount showing the amount of pages to be turned does not need to be limited to a number that is a page as a unit. The number does not need to be limited to the page number, and a quantity based on other unit may be displayed on the display surface 11c as the amount of pages to be turned. For example, a ratio (%) of the targeted page number with respect to the total page number, the number of paragraphs, etc., may be displayed on the display surface 11c as the amount of pages to be turned. As an example, in FIG. 30(c), in the amount to be turned display column C3, the number of paragraphs to be moved forward (+38) is displayed on the display surface 11c as the amount of pages to be turned.

Further, the amount of pages to be turned in the present invention can be set indirectly as the targeted page number p, or it can be set directly as a difference between the currently displayed page and the targeted page number p. That is, the amount of pages to be turned in the present invention can be any value as long as the page after being turned can be specified.

Furthermore, in the above embodiment, the present invention is applied to a so-called bar phone (a smart phone). However, the present invention can not only to this type, but also be applied to any types of cellular phones such as a flip phone, a slider phone, etc.

Moreover, the mobile terminal device of the present invention is not limited to the cellular phones, but can also be applied to a PDA (Personal Digital Assistant), a Tablet PC, an e-book reader, etc.

The embodiment of the present invention may be modified variously and suitably within the scope of the technical idea described in claims.

REFERENCE SIGNS LIST

1 Cellular phone
11 Display
11c Display surface
12 Touch sensor
100 CPU
L1 Tagged list

The invention claimed is:

1. A mobile terminal device, comprising:
a display panel having a display surface and a touch sensor associated with the display surface;
at least one processor configured to detect an input with respect to the touch sensor and to control the display panel wherein in the case where a current page P of an electronic document remains displayed on the display surface,
the at least one processor is configured:
to update an estimated number of pages to be turned while an input on the display surface is continuously detected by the touch sensor, and
to determine an actual number N of pages to be turned based on the estimated number of pages to be turned when the input on the display surface is terminated,
to determine a targeted page of the electronic document (P+N) based on the current page and the actual number N of pages to be turned and to display on the display surface a plurality of thumbnail images of previously tagged pages of the electronic document within a predetermined page range before and after the targeted page of the electronic document, wherein the previously tagged pages include at least one of a page to which a tag is put by a user, a page where each chapter of the electronic document starts and a page including predetermined key words, and
in response to receiving an input for selecting one of the displayed thumbnail images, to further display the tagged page corresponding to the selected thumbnail image as the current page on the display surface.

2. The mobile terminal device according to claim 1, wherein
the at least one processor is further configured to detect an input position with respect to the touch sensor, and
to determine increase or decrease of the updated estimated number of pages to be turned based on a change of the input position while the input with respect to the touch sensor continues.

3. The mobile terminal device according to claim 1, wherein
the at least one processor is further configured to detect an input position with respect to the touch sensor, and
to change an updating rate of the updated estimated number of pages to be turned in the input continuing period, based on a change of the input position while the input with respect to the touch sensor continues.

4. The mobile terminal device according to claim 1, wherein
the at least one processor is further configured to detect an input dimensions with respect to the touch sensor, and
to determine an updating rate of the updated estimated number of pages to be turned in the input continuing period, based on a change of the input dimensions while the input with respect to the touch sensor continues.

5. The mobile terminal device according to claim 1, wherein
the at least one processor is further configured to display a thumbnail image of a page of the electronic document which is obtained by turning pages by the determined actual number of pages to be turned from a currently displayed page on the display surface.

6. The mobile terminal device according to claim 5, wherein
the at least one processor is further configured to display the thumbnail image on the display surface while a change of the updated estimated number of pages to be turned is stopped.

7. The mobile terminal device according to claim 1, wherein
the at least one processor is further configured to determine that a selection input to turn a page forward or backward is performed with respect to the touch sensor, and, according to a result of the determination, to display a page of the electronic document which is obtained by turning pages forward or backward by the determined number of pages to be turned from the currently displayed page on the display surface.

8. The mobile terminal device according to claim 1, wherein
the at least one processor is configured to display a thumbnail table including the plurality of thumbnail images corresponding to the previously tagged pages on the display surface, and to scroll the thumbnail images on the thumbnail table to display thumbnail images of tagged pages based on detection of a predetermined user input for scrolling the thumbnail table being performed with respect to the display surface.

9. The mobile terminal device according to claim 1, wherein the at least one processor is configured to update a number of pages to be turned for the electronic document as the updated estimated number of pages to be turned.

10. The mobile terminal device according to claim 1, wherein the processor is configured to display a scale on the display surface which indicates a series of updating degrees where each updating degree comprises a selected number of pages to be turned.

11. The mobile terminal device according to claim 10, wherein the processor is configured to change the updating degree based on an input touch position on the touch sensor.

* * * * *